US011348295B2

(12) United States Patent
Takeyama et al.

(10) Patent No.: US 11,348,295 B2
(45) Date of Patent: May 31, 2022

(54) COLLAGE IMAGE CREATION SYSTEM, METHOD, AND NON-TRANSITORY COMPUTER READABLE RECORDING MEDIUM STORING THE COLLAGE IMAGE CREATION PROGRAM

(71) Applicant: FUJIFILM Corporation, Tokyo (JP)

(72) Inventors: Saki Takeyama, Tokyo (JP); Ryuichiro Takai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/820,253

(22) Filed: Mar. 16, 2020

(65) Prior Publication Data
US 2020/0311997 A1 Oct. 1, 2020

(30) Foreign Application Priority Data
Mar. 28, 2019 (JP) .................................. 2019-063241

(51) Int. Cl.
*G06T 11/60* (2006.01)
*G06F 3/12* (2006.01)

(52) U.S. Cl.
CPC ............ *G06T 11/60* (2013.01); *G06F 3/1208* (2013.01); *G06F 3/1256* (2013.01);
(Continued)

(58) Field of Classification Search
None
See application file for complete search history.

(56) References Cited

U.S. PATENT DOCUMENTS 8,126,192 B2 * 2/2012 Sagoo .................. G11B 27/034
382/100
9,961,222 B2 * 5/2018 Miyamoto ......... G06K 9/00221
(Continued)

FOREIGN PATENT DOCUMENTS

| JP | 2004-172838 A | 6/2004 |
|---|---|---|
| JP | 2013-042274 A | 2/2013 |

(Continued)

OTHER PUBLICATIONS

The extended European search report issued by the European Patent Office dated Sep. 28, 2020, which corresponds to European Patent Application No. 20162454.1-1209 and is related to U.S. Appl. No. 16/820,253.
(Continued)

*Primary Examiner* — Mohammad H Ghayour
*Assistant Examiner* — Pawan Dhingra
(74) *Attorney, Agent, or Firm* — Studebaker & Brackett PC

(57) ABSTRACT

Portable terminals 100-1 to 100-N of a plurality of users have roles divided into one portable terminal 100-1 functioning as a host and other portable terminals 100-2 to 100-N (one or more second portable terminals) functioning as a client, and communication needed for creation of a collage image can be performed between the portable terminal 100-1 and other portable terminals 100-2 to 100-N. Accordingly, even though a plurality of users participate in creation of a collage image, it is possible to allow the user of each portable terminal to perform operations for selection of an image for use in the creation of the collage image, edition of the selected image, and the like in parallel with operations of other users for selection, edition, and the like of images without waiting for the operations of other users, and to create the collage image in a comparatively short time.

11 Claims, 27 Drawing Sheets

(52) U.S. Cl.
CPC .......... *G06F 3/1257* (2013.01); *G06F 3/1292* (2013.01); *G06F 2206/1512* (2013.01); *G06T 2200/24* (2013.01)

(56) References Cited

U.S. PATENT DOCUMENTS

| | | | |
|---|---|---|---|
| 10,327,015 B2* | 6/2019 | Cheng | G06T 5/50 |
| 10,762,716 B1* | 9/2020 | Paul | G06F 3/165 |
| 2016/0093020 A1* | 3/2016 | Basalamah | H04N 5/2624 |
| | | | 345/634 |
| 2017/0085691 A1* | 3/2017 | Kim | H04M 1/724 |
| 2017/0126689 A1* | 5/2017 | Lloyd | H04L 61/1594 |
| 2018/0027268 A1* | 1/2018 | Cheng | G06T 11/60 |
| | | | 375/240.26 |
| 2018/0082455 A1* | 3/2018 | Yamaji | G06K 9/00684 |
| 2018/0145937 A1* | 5/2018 | Choi | H04M 1/7243 |
| 2018/0247440 A1* | 8/2018 | Heo | G06T 11/001 |
| 2020/0092484 A1* | 3/2020 | Ito | H04N 21/4788 |

FOREIGN PATENT DOCUMENTS

| | | |
|---|---|---|
| JP | 2013-097410 A | 5/2013 |
| JP | 2018-529138 A | 10/2018 |

OTHER PUBLICATIONS

An Office Action; "Notice of Reasons for Refusal", mailed by the Japanese Patent Office dated Nov. 12, 2021, which corresponds to Japanese Patent Application No. 2019-063241 and is related to U.S. Appl. No. 16/820,253; with English language translation.
Communication pursuant to Article 94(3) EPC issued by the European Patent Office dated Aug. 17, 2021, which corresponds to European Patent Application No. 20162454.1-1209 and is related to U.S. Appl. No. 16/820,253.

* cited by examiner

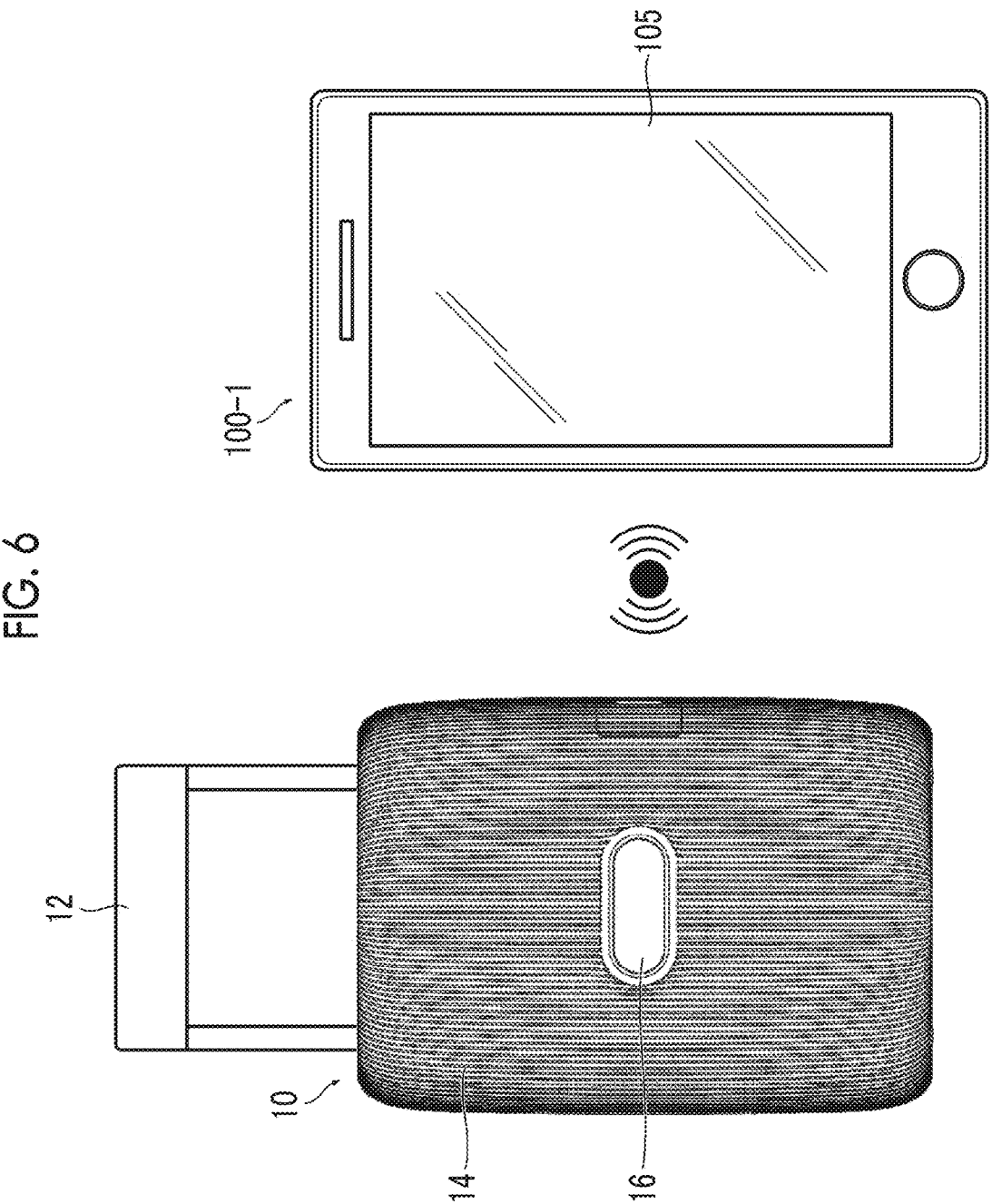

COLLAGE IMAGE CREATION SYSTEM, METHOD, AND NON-TRANSITORY COMPUTER READABLE RECORDING MEDIUM STORING THE COLLAGE IMAGE CREATION PROGRAM

CROSS-REFERENCE TO RELATED APPLICATIONS

The present application claims priority under 35 U.S.C. § 119 to Japanese Patent Application No. 2019-063241, filed on Mar. 28, 2019. Each of the above application(s) is hereby expressly incorporated by reference, in its entirety, into the present application.

BACKGROUND OF THE INVENTION

1. Field of the Invention

The present invention relates to a collage image creation system, method, and program, and in particular, to a technique for creating a collage image among a plurality of users.

2. Description of the Related Art

In the related art, a technique for allowing a plurality of users to create one collage image in cooperation is known (JP2018-529138A).

In a picture combining method described in JP2018-529138A, a target collage template is selected in a transmission side client (first terminal), at least one picture is added to the selected target collage template to create a first collage, and the created first collage is transmitted to a reception side client (second terminal).

In a case where the first collage is received, the reception side client detects whether or not a blank portion is present in the first collage (target collage template), and when the blank portion is present, at least one picture is added to the blank portion to create a second collage.

In this way, pictures are sequentially added to the target collage template by the respective clients, and a collage image is created.

SUMMARY OF THE INVENTION

In the picture combining method described in JP2018-529138A, the first terminal adds a picture to the target collage template to create the first collage and transfers the first collage to the second terminal, and the second terminal further adds a picture to the first collage to create the second collage. As the processing is sequentially performed among terminals of a plurality of users until the blank portion is not present in the target collage template, in order to complete the collage image, the respective terminals need to individually execute processing for adding (combining) a picture with the target collage template.

Furthermore, since there is a need to sequentially transmit the first collage, the second collage, . . . created in the respective terminals to post-stage terminals, it is not possible to create the first collage, the second collage, . . . simultaneously. For example, the user of the second terminal is not able to be involved in creating the collage image until the first collage is received from the first terminal, and is not able to select the picture to be added to the blank portion of the target collage template.

For this reason, there is a problem in that a time (a time needed for selection or imaging of a picture of the user, image processing, and transmission and reception of the first collage, . . . ) needed for creating the first collage, the second collage, . . . is accumulated for each user, and a lot of time is needed until creation of a final collage image. In particular, as the number of users (terminals) involved in creating the collage image increases, a lot of time is needed until the creation of the final collage image.

The invention has been accomplished in view of such circumstances, and an object of the invention is to provide a collage image creation system, method, and program capable of creating a collage image in a comparatively short time regardless of the number of users who participate in the creation of the collage image.

In order to achieve the above-described object, an aspect of the invention provides a collage image creation system comprising one first portable terminal that functions as a host, and one or more second portable terminals that function as a client and are able to perform communication with the first portable terminal. The collage image creation system creates a collage image based on a first image stored in the first portable terminal and a second image stored in the second portable terminal. The first portable terminal comprises a first display unit, a layout selection unit that selects one layout from among a plurality of layouts for collage image creation, a first layout display controller that makes the first display unit display the selected layout, a first image selection unit that selects the first image for use in the creation of the collage image from among a plurality of images stored in the first portable terminal, a first display controller that makes the selected first image be displayed within a first frame allocated to the first portable terminal among a plurality of frames of the layout displayed on the first display unit, a first edition instruction reception unit that receives an edition instruction to the first image, a first edition unit that edits the first image displayed within the first frame according to the edition instruction received by the first edition instruction reception unit, and a first communication unit that transmits information regarding the selected layout to the second portable terminal and receives the second image selected in the second portable terminal from the second portable terminal. The second portable terminal comprises a second display unit, a second layout display controller that makes the second display unit display the layout based on the information regarding the layout transmitted from the first portable terminal, a second image selection unit that selects the second image for use in the creation of the collage image from among a plurality of images stored in the second portable terminal, a second display controller that makes the selected second image be displayed within a second frame allocated to the second portable terminal among the plurality of frames of the layout displayed on the second display unit, a second edition instruction reception unit that receives an edition instruction to the second image, a second edition unit that edits the second image displayed within the second frame according to the edition instruction received by the second edition instruction reception unit, and a second communication unit that receives the information regarding the layout transmitted from the first portable terminal and transmits the edited second image to the first portable terminal. The first portable terminal comprises an image composition unit that composes the first image edited by the first edition unit within the first frame of the layout and composes the second image edited by the second edition unit within the second frame to create the collage image.

According to the aspect of the invention, the portable terminals of a plurality of users have roles divided into one portable terminal (first portable terminal) functioning as a host and other portable terminals (one or more second portable terminals) functioning as a client, and needed communication can be performed between the first portable terminal and the second portable terminal. Accordingly, even though a plurality of user participate in the creation of the collage image, it is possible to allow the user of each portable terminal to perform operations for selection of an image for use in the creation of the collage image, edition of the selected image, and the like in parallel with operations of other users for selection, edition, and the like of images without waiting for the operations of other users, and to create the collage image in a comparatively short time.

In the collage image creation system according to another aspect of the invention, it is preferable that the first edition instruction reception unit receives at least one edition instruction among magnification, reduction, movement, rotation, and image processing contents of the first image, the first display controller makes the first image processed based on the edition instruction received by the first edition instruction reception unit be displayed within the first frame of the layout displayed on the first display unit, the second edition instruction reception unit receives at least one edition instruction among magnification, reduction, movement, rotation, and image processing contents of the second image, and the second display controller makes the second image processed based on the edition instruction received by the second edition instruction reception unit be displayed within the second frame of the layout displayed on the second display unit.

That is, it is possible to allow the user of the first portable terminal or the second portable terminal to edit the first image or the second image while viewing the first image within the first frame or the second image within the second frame of the layout displayed on the screen of the portable terminal of the user.

Still another aspect of the invention provides a collage image creation system comprising one first portable terminal that functions as a host and has a first camera unit, and one or more second portable terminals that function as a client, are able to perform communication with the first portable terminal, and have a second camera unit. The collage image creation system creates a collage image based on a first image captured by the first camera unit of the first portable terminal and a second image captured by the second camera unit of the second portable terminal. The first portable terminal comprises a first display unit, a layout selection unit that selects one layout from among a plurality of layouts for collage image creation, a first layout display controller that makes the first display unit display the selected layout, a first display controller that makes the first image captured by the first camera unit be displayed within a first frame allocated to the first portable terminal among a plurality of frames of the layout displayed on the first display unit, and a first communication unit that transmits information regarding the selected layout to the second portable terminal and receives the second image captured by the second camera unit from the second portable terminal. The second portable terminal comprises a second display unit, a second layout display controller that makes the layout be displayed on the second display unit based on the information regarding the layout transmitted from the first portable terminal, a second display controller that makes the second image captured by the second camera unit be displayed within a second frame allocated to the second portable terminal among the plurality of frames of the layout displayed on the second display unit, and a second communication unit that receives the information regarding the layout transmitted from the first portable terminal and transmits the second image captured by the second camera unit to the first portable terminal. The first display controller updates the first image displayed within the first frame of the layout displayed on the first display unit with a latest first image captured by the first camera unit. The second display controller updates the second image displayed within the second frame of the layout displayed on the second display unit with a latest second image captured by the second camera unit. The first portable terminal comprises an image composition unit that composes the latest first image captured by the first camera unit within the first frame of the layout and composes the latest second image captured by the second camera unit within the second frame.

According to still another aspect of the invention, there is a difference in that an image for use in creation of a collage image is acquired through imaging compared to the aspect of the invention in which an image for use in creation of a collage image is selected from among a plurality of images stored in a portable terminal, and edition of the selected image is possible. Since a captured image is used in creation of a collage image, edition, such as magnification or movement, of the captured image is not needed in the creation of the collage image.

In the collage image creation system according to still another aspect of the invention, the first portable terminal may display a live view image captured by the first camera unit within the first frame allocated to the first portable terminal in the layout displayed on the first display unit, and the second portable terminal may display a live view image captured by the second camera unit within the second frame allocated to the second portable terminal in the layout displayed on the second display unit. With this, it is possible to allow the user to capture an image for use in the collage image while viewing the live view image displayed within the first frame or the second frame of the layout.

In the collage image creation system according to still another aspect of the invention, it is preferable that the first layout display controller makes the allocated first frame be displayed on the first display unit to be identifiable from other frames, and the second layout display controller makes the allocated second frame be displayed on the second display unit to be identifiable from other frames.

In the collage image creation system according to still another aspect of the invention, it is preferable that the first communication unit of the first portable terminal and the second communication unit of the second portable terminal perform wireless communication with each other directly or perform communication with each other through an access point and a network.

In the collage image creation system according to still another aspect of the invention, it is preferable that only the first portable terminal comprises a transmission unit that transmits the collage image to a printer.

In the collage image creation system according to still another aspect of the invention, it is preferable that the first portable terminal comprises a print instruction reception unit that receives a print instruction, the print instruction reception unit receives a print instruction of the collage image only in a case where the collage image in which the first image and the second image are composed within all frames of the layout is created, and the transmission unit transmits the collage image to the printer in a case where the print instruction reception unit receives the print instruction. With this, it is possible to restrain an uncompleted collage image from being transmitted to the printer and printed out.

In the collage image creation system according to still another aspect of the invention, it is preferable that the first portable terminal comprises a mode selection unit that selects a first mode in which the first display unit is made to display the first image and the second image and a second mode in which the first display unit is made to display only the first image, the first display controller of the first portable terminal composes the first image within the first frame of the layout displayed on the first display unit and composes the second image within the second frame in a case where the first mode is selected, and composes only the first image within the first frame of the layout displayed on the first display unit in a case where the second mode is selected, and the second display controller of the second portable terminal composes the first image within the first frame of the layout displayed on the second display unit and composes the second image within the second frame in a case where the first mode is selected, and composes only the second image within the second frame of the layout displayed on the first display unit in a case where the second mode is selected.

In the collage image creation system according to still another aspect of the invention, it is preferable that each of the first portable terminal and the second portable terminal comprises a function selection unit that makes the first portable terminal or the second portable terminal function as the host or the client, the first portable terminal becomes the second portable terminal in a case where a function of the client is selected by the function selection unit, and the second portable terminal becomes the first portable terminal in a case where a function of the host is selected by the function selection unit.

Still another aspect of the invention provides a collage image creation method that uses one first portable terminal functioning as a host, and one or more second portable terminals functioning as a client and being able to perform communication with the first portable terminal, and creates a collage image based on a first image stored in the first portable terminal and a second image stored in the second portable terminal. The collage image creation method comprises a step of selecting one layout from among a plurality of layouts for collage image creation with a layout selection unit of the first portable terminal, a step in which a first layout display controller of the first portable terminal makes a first display unit of the first portable terminal display the selected layout, a step of selecting the first image for use in the creation of the collage image from a plurality of images stored in the first portable terminal through an image selection operation in a first image selection unit of the first portable terminal, a step in which a first display controller of the first portable terminal makes the selected first image be displayed within a first frame allocated to the first portable terminal among a plurality of frames of the layout displayed on the first display unit, a step in which, in a case where a first edition instruction reception unit of the first portable terminal receives an edition instruction, a first edition unit edits the first image displayed within the first frame according to the received edition instruction, a step in which a first communication unit of the first portable terminal transmits information regarding the selected layout to the second portable terminal and receives the second image selected in the second portable terminal from the second portable terminal, a step in which a second layout display controller of the second portable terminal makes a second display unit of the second portable terminal display the layout based on the information regarding the layout transmitted from the first portable terminal, a step of selecting the second image for use in the creation of the collage image from a plurality of images stored in the second portable terminal through an image selection operation in a second image selection unit of the second portable terminal, a step in which a second display controller of the second portable terminal makes the selected second image be displayed within a second frame allocated to the second portable terminal among the plurality of frames of the layout displayed on the second display unit, a step in which, in a case where a second edition instruction reception unit of the second portable terminal receives an edition instruction, a second edition unit edits the second image displayed within the second frame according to the received edition instruction, a step in which a second communication unit of the second portable terminal receives the information regarding the layout transmitted from the first portable terminal and transmits the edited second image to the first portable terminal, and a step in which an image composition unit of the first portable terminal composes the edited first image within the first frame of the layout and composes the edited second image within the second frame to create the collage image.

Still another aspect of the invention provides a collage image creation method that uses one first portable terminal functioning as a host and having a first camera unit, and one or more second portable terminals functioning as a client, being able to perform communication with the first portable terminal, and having a second camera unit, and creates a collage image based on a first image captured by the first camera unit of the first portable terminal and a second image captured by the second camera unit of the second portable terminal. The collage image creation method comprises a step of selecting one layout from among a plurality of layouts for collage image creation with a layout selection unit of the first portable terminal, a step in which a first layout display controller of the first portable terminal makes a first display unit of the first portable terminal display the selected layout, a step of capturing the first image with the first camera unit, a step in which a first display controller of the first portable terminal makes the first image captured by the first camera unit be displayed within a first frame allocated to the first portable terminal among a plurality of frames of the layout displayed on the first display unit, a step in which a first communication unit of the first portable terminal transmits information regarding the selected layout to the second portable terminal and receives the second image captured by the second camera unit from the second portable terminal, a step in which a second layout display controller of the second portable terminal makes a second display unit of the second portable terminal display the layout based on the information regarding the layout transmitted from the first portable terminal, a step of capturing the second image with the second camera unit, a step in which a second display controller of the second portable terminal makes the second image captured by the second camera unit be displayed within a second frame allocated to the second portable terminal among the plurality of frames of the layout displayed on the second display unit, a step in which a second communication unit of the second portable terminal receives the information regarding the layout transmitted from the first portable terminal and transmits the second image captured by the second camera unit to the first portable terminal, and a step in which an image composition unit of the first portable terminal composes a latest first image captured by the first camera unit within the first frame of the layout and composes a latest second image captured by the second camera unit within the second frame to create the collage image. In the step of making the first image be displayed within the first frame, the first image displayed within the first frame is updated with the latest first image captured by the first camera unit. In the step of making the second image be displayed within the second frame, the second image displayed within the second frame is updated with the latest second image captured by the second camera unit.

Still another aspect of the invention provides a collage image creation program that is installed on a portable terminal. The collage image creation program is installed on the portable terminal to make the portable terminal function as the first portable terminal or the second portable terminal constituting the above-described collage image creation system.

According to the aspects of the invention, it is possible to create a collage image in a comparatively short time regardless of the number of users who participate in the creation of the collage image when a plurality of users create one collage image in cooperation.

BRIEF DESCRIPTION OF THE DRAWINGS

FIG. 6 is a diagram showing a manner in which an image (collage image) is transmitted from the portable terminal 100-1 to a printer 10 and printed out.

FIG. 16 is a diagram showing a screen corresponding to FIG. 12, and is a diagram showing a state in which the fun mode is ON.

DESCRIPTION OF THE PREFERRED EMBODIMENTS

Preferred embodiments of a collage image creation system, method, and program according to the invention will be described referring to the accompanying drawings.

Collage Image Creation System of First Embodiment

Figure 1:
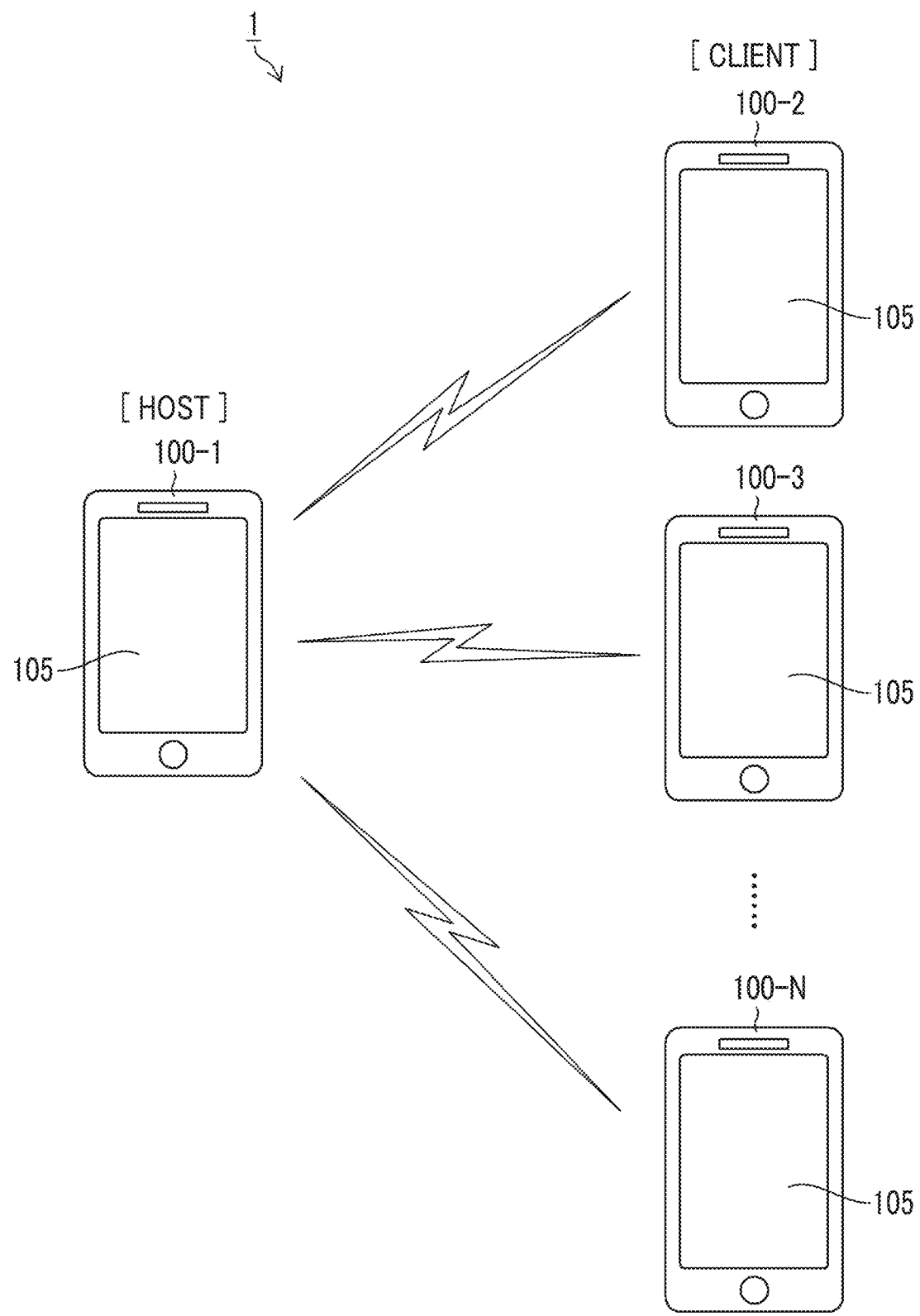
FIG. 1 is a system configuration diagram showing a collage image creation system according to a first embodiment of the invention.

FIG. 1 is a system configuration diagram showing a collage image creation system according to a first embodiment of the invention.

A collage image creation system 1 of the first embodiment shown in FIG. 1 is constituted of a plurality of portable terminals 100-1 to 100-N that are carried with a plurality of users.

As a plurality of portable terminals 100-1 to 100-N, smartphones, tablet terminals, personal digital assistants (PDAs), notebook personal computers, and the like can be applied.

A plurality of portable terminals 100-1 to 100-N of the example have various functions described below as application software (a collage image creation program according to the embodiment of the invention) attached to a printer is installed and the collage image creation program is executed.

A plurality of portable terminals 100-1 to 100-N are not limited to the portable terminals of the same kind or having the same function, and it should suffice that at least the collage image creation program can be installed and executed, and wireless communication can be performed among a plurality of portable terminals 100-1 to 100-N directly or wireless communication can be performed among a plurality of portable terminals 100-1 to 100-N through a network.

Portable Terminal

Figure 2:
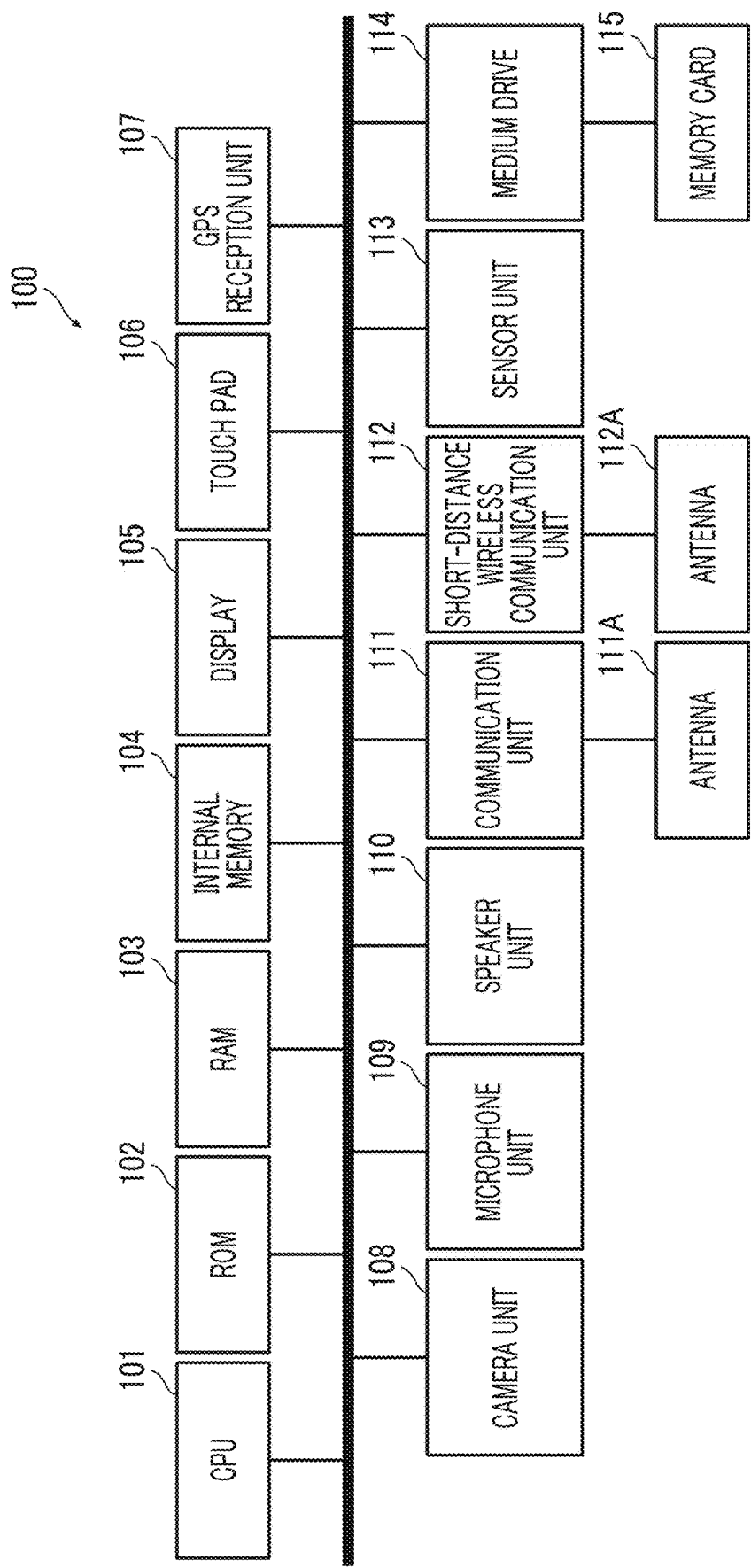
FIG. 2 is a block diagram showing an example of the hardware configuration of a portable terminal that is applied to the collage image creation system shown in FIG. 1.

FIG. 2 is a block diagram showing an example of the hardware configuration of the portable terminal that is applied to the collage image creation system shown in FIG. 1.

A plurality (N) of portable terminals 100-1 to 100-N shown in FIG. 1 have the same function regarding creation of a collage image as the collage image creation program is installed, and thus, in FIG. 2, only one portable terminal 100 representing a plurality of portable terminals 100-1 to 100-N is shown. In the example, a smartphone is used as the portable terminal 100.

As shown in FIG. 2, the portable terminal (smartphone) 100 comprises a central processing unit (CPU) 101 that controls the overall operation, a read-only memory (ROM) 102 that stores a basic input/output program and the like, a random access memory (RAM) 103 that is used as a work area of the CPU 101, an internal memory 104, a display 105, a touch pad 106 that detects a touch operation (position input) on a display screen, a global positioning systems (GPS) reception unit 107 that receives GPS signals including positional information (latitude, longitude, and altitude) of the portable terminal 100 from GPS satellites or an indoor messaging system (IMES) as an indoor GPS, a camera unit 108 that includes an imaging lens and an image sensor and captures an image in an electronic manner, a microphone unit 109 that includes a microphone and inputs voice, a speaker unit 110 that includes a speaker and output voice, a communication unit 111 that performs communication through an access point, such as a nearest base station or a router, and a network using an antenna 111A in a wireless manner, a short-distance wireless communication unit 112 that performs communication with other kinds of equipment (for example, other portable terminals, a printer, and the like) using an antenna 112A in a short-distance wireless manner, a sensor unit 113 that includes various sensors, such as a geomagnetic sensor, a gyrocompass, and an acceleration sensor, a medium drive 114 that performs reading and writing of data from and to a memory card 115, and the like.

The internal memory 104 is constituted of a nonvolatile memory, such as an electrically erasable programmable read-only memory (EEPROM). In the internal memory 104, in addition to an operating system, various kinds of application software including the collage image creation program according to the embodiment of the invention, and various kinds of data, such as image data of images captured by the camera unit 108 and image data acquired from other kinds of equipment, are stored.

The collage image creation program is application software attached to a printer described below, and is downloaded, for example, from a service site of the printer on the network through the communication unit 111. The portable terminals 100-1 to 100-N shown. in FIG. 1 have downloaded application software including the collage image creation program, and constitute the collage image creation system 1 shown in FIG. 1.

Top Screen

Figure 3:
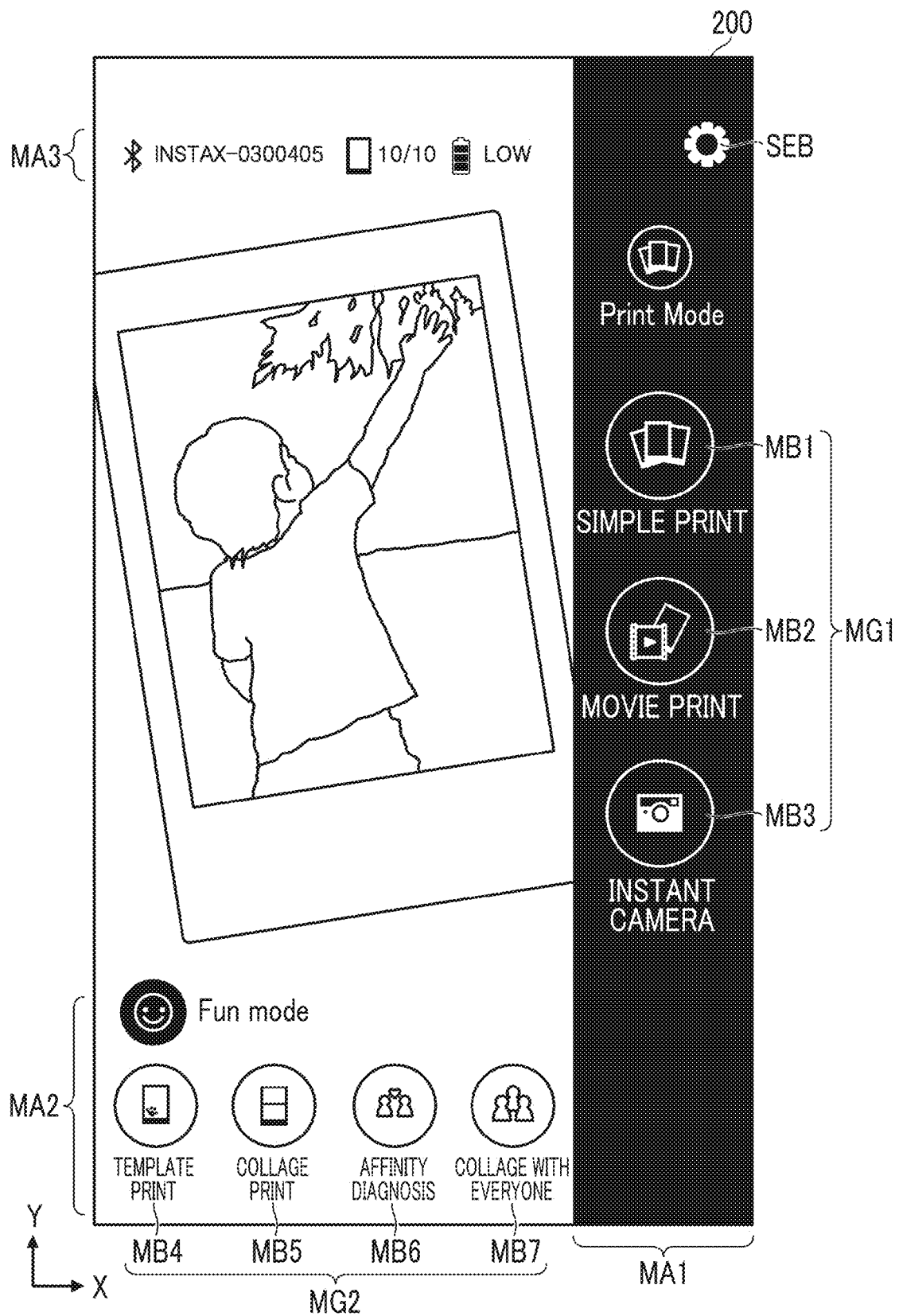
FIG. 3 is a diagram showing an example of a top screen that is displayed on a display of the portable terminal with execution of application software including a collage image creation program.

FIG. 3 is a diagram showing an example of a top screen 200 that is initially displayed on the display 105 of the portable terminal 100 as application software including the collage image creation program is executed.

Buttons for usable functions are displayed as icons on the top screen 200. That is, figures, symbols, or patterns are displayed in combination. Specifically, as shown in FIG. 3, a "simple print" button MB1 as a button for a function of simple print, a "movie print" button MB2 as a button for a function of movie print, an "instant camera" button MB3 as a button for a function of instant camera, a "template print" button MB4 as a button for a function of template print, a "collage print" button MB5 as a button for a function of collage print, an "affinity diagnosis" button MB6 as a button for a function of affinity diagnosis, and a "collage with everyone" button MB7 as a button for a function of collage with everyone are displayed. A menu title is displayed below each button.

The function of "simple print" is a function of printing an image (static image) stored in the portable terminal 100. In a case where the "simple print" button MB1 is touched (tapped) on the screen, the function is activated.

The function of "movie print" is a function of extracting one scene from video and printing the extracted scene. In a case where the "movie print" button MB2 is touched on the screen, the function is activated.

The function of "instant camera" is a function of performing imaging using a camera function of the portable terminal 100 and printing a captured image using the printer. In a case where the "instant camera" button MB3 is touched on the screen, the function is activated.

The function of "template print" is a function of composing a template image with an image and printing a composite image. In a case where the "template print" button MB4 is touched on the screen, the function is activated.

The function of "collage print" is a function of generating and printing a collage image. As described above, the collage image is generated by applying an image to each area of a layout (divided frames), the inside of which is divided into a plurality of areas. An aspect of a layout includes a regular layout (for example, longitudinal two-equal division, lateral two-equal division, longitudinal three-equal division, lateral three-equal division, four-equal division, nine-equal division, or the like), and an irregular layout. Regular division is particularly referred to as divided print. In a case where the "collage print" button MB5 is touched on the screen, the function is activated.

The function of "affinity diagnosis" is a function of performing affinity diagnosis from an image. For example, an image is analyzed using a learned model, and affinity of characters (two persons) reflected in the image is diagnosed. In a case where the "affinity diagnosis" button MB6 is touched on the screen, the function is activated.

The function of "collage with everyone" is a function of generating a collage image through the cooperation of a plurality of persons and printing the collage image. In a case where the "collage with everyone" button MB7 is touched on the screen, the function is activated.

As shown in FIG. 3, the buttons for the functions are displayed to be divided into two groups (first group MG1 and second group MG2) on the top screen 200.

The first group MG1 is a group to which the buttons for the functions of "simple print", "movie print", and "instant camera" belong. The first group MG1 is a group of the functions having simple print as a principal purpose. The group is referred to as a group of "Print Mode".

The second group MG2 is a group to which the buttons for the functions of "template print", "collage print", "affinity diagnosis", and "collage with everyone" belong. The second group MG2 is a group of the functions having advanced print needing processing, edition, and the like as a principal purpose. The group is referred to as a group of "Fun Mode".

The buttons (the "simple print" button MB1, the "movie print" button MB2, and the "instant camera" button MB3) belonging to the first group MG1 are displayed in a first group display area MA1, and the buttons (the "template print" button MB4, the "collage print" button MR5, the "affinity diagnosis" button MB6, and the "collage with everyone" button MB7) belonging to the second group MG2 are displayed in a second group display area MA2. The first group display area MA1 is set at a screen right end of the top screen 200, and the second group display area MA2 is set in the lower screen portion.

A "set" button SEB is further displayed on the top screen 200. The "set" button SEB is a button for calling a screen (setting screen) on which various settings are performed. The "set" button SEB is displayed on a screen upper right side.

In a case where the printer is connected (in a case where communication is established), information regarding the connected printer is displayed on the top screen 200. Information regarding the printer is displayed in a printer information display area MA3. The printer information display area MA3 is set in a screen upper portion. In the printer information display area MA3, information regarding a name (for example, a model name), a remaining amount of film, and a battery remaining quantity of the connected printer is displayed. The information is acquired from the printer when communication with the printer is established.

Portable Terminal 100-1 of First Embodiment

Figure 4:
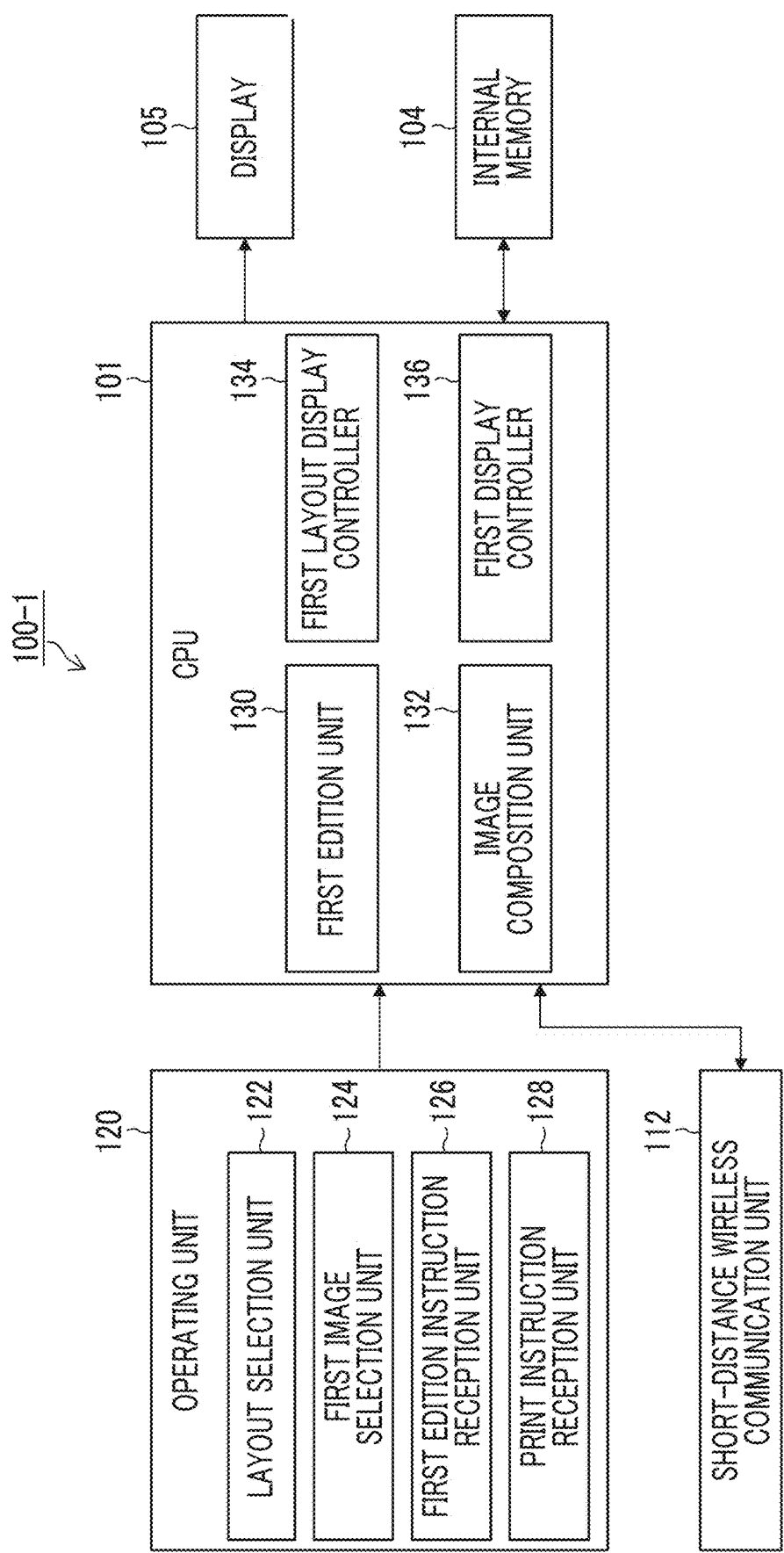
FIG. 4 is a block diagram showing principal functions of a portable terminal 100-1 functioning as a host of the first embodiment.

FIG. 4 is a block diagram showing principal functions of the portable terminal (first portable terminal) 100-1 functioning as a host of the first embodiment in the collage image creation system 1 shown in FIG. 1.

In a case where the "collage with everyone" button MB7 on the top screen 200 shown in FIG. 3 is touched, the screen of the display 105 is transited from the top screen 200 to a screen for selecting whether to participate in creation of a collage image as a host or to participate in the creation of the collage image as a client. As an operation to participate as a host is performed on the screen with the function selection unit, thereafter, the portable terminal 100-1 functions as a host.

In FIG. 4, the portable terminal 100-1 functioning as a host is constituted of an operating unit 120 that has the touch pad 106 and the like, the CPU 101 that executes the collage image creation program to function as a first edition unit 130, an image composition unit 132, a first layout display controller 134, and a first display controller 136, the internal memory 104, the display 105 that functions as a first display unit, and the short-distance wireless communication unit 112 that functions as a first communication unit.

The operating unit 120 includes a layout selection unit 122, a first image selection unit 124, a first edition instruction reception unit 126, and a print instruction reception unit 128.

The layout selection unit 122 is an operating unit that selects one layout through a user's operation from among a plurality of layouts for collage image creation stored in the internal memory 104 or the like. The layout is provided with a plurality of frames in which a plurality of images are composed (fitted). Information regarding the selected layout is added to the first layout display controller 134, the image composition unit 132, and the like.

The first image selection unit 124 is an operating unit that selects an image (first image) for use in the creation of the collage image from among a plurality of images stored in the internal memory 104 or the like. The first image selected by the first image selection unit 124 is added to the first display controller 136, the image composition unit 132, and the like.

The first edition instruction reception unit 126 is an operating unit that performs an edition instruction to the selected first image, and for example, gives an instruction of magnification, reduction, movement, and rotation for trimming the first image or gives an instruction of image processing contents (various kinds of filter processing, brightness adjustment, contrast adjustment, saturation adjustment, and the like) on the first image.

The first edition unit 130 edits the first image displayed within the first frame according to the edition instruction received by the first edition instruction reception unit 126.

The first layout display controller 134 makes the display 105 display the layout for collage image creation based on information regarding the selected layout.

The first display controller 136 makes the first image selected by the first image selection unit 124 be displayed within the first frame allocated to the portable terminal 100-1 among a plurality of frames of the layout displayed on the display 105. In a case where the first image is edited by the first edition unit 130, the first image after edition is displayed within the first frame. With this, it is possible to allow the user to confirm an edition result of the first image.

The short-distance wireless communication unit 112 transmits information regarding the selected layout and the first image to one or more other portable terminals (second portable terminals) 100-2 to 100-N. In a case where the first image is edited by the first edition unit 130, the first image after edition or edition information indicating an edition content is transmitted to the portable terminals 100-2 to 100-N.

The short-distance wireless communication unit 112 receives images (second images), which are selected in the portable terminals 100-2 to 100-N in the same manner and edited, from the portable terminals 100-2 to 100-N.

The image composition unit 132 composes the first image edited by the first edition unit 130 within the first frame of the layout and composes the second images received from the portable terminals 100-2 to 100-N within second frames of the layout allocated to the portable terminals 100-2 to 100-N. The image composition unit 132 composes the first image and one or more second images within all frames of the layout to create the collage image.

The print instruction reception unit 128 is a part that receives a print instruction from the user in printing out the created collage image. The print instruction reception unit 128 receives the print instruction of the collage image only in a case where the collage image, in which the first image and the second images are composed within all frames of the layout, is created.

In a case where the print instruction reception unit 128 receives the print instruction, the portable terminal 100-1 functioning as a host transmits the collage image from the short-distance wireless communication unit 112 functioning as a transmission unit to the printer 10 as shown in FIG. 6.

In FIG. 6, the printer 10 is constituted of a portable mobile printer. The printer 10 is constituted of an instant printer that prints an image on an instant film 12. For the instant film 12, a sheet film type (also referred to as a mono-sheet type) is used. Reference numeral 14 represents an exterior housing of the printer 10, and reference numeral 16 represents a power button 16 of the printer 10.

Portable Terminal 100-2 of First Embodiment

Figure 5:
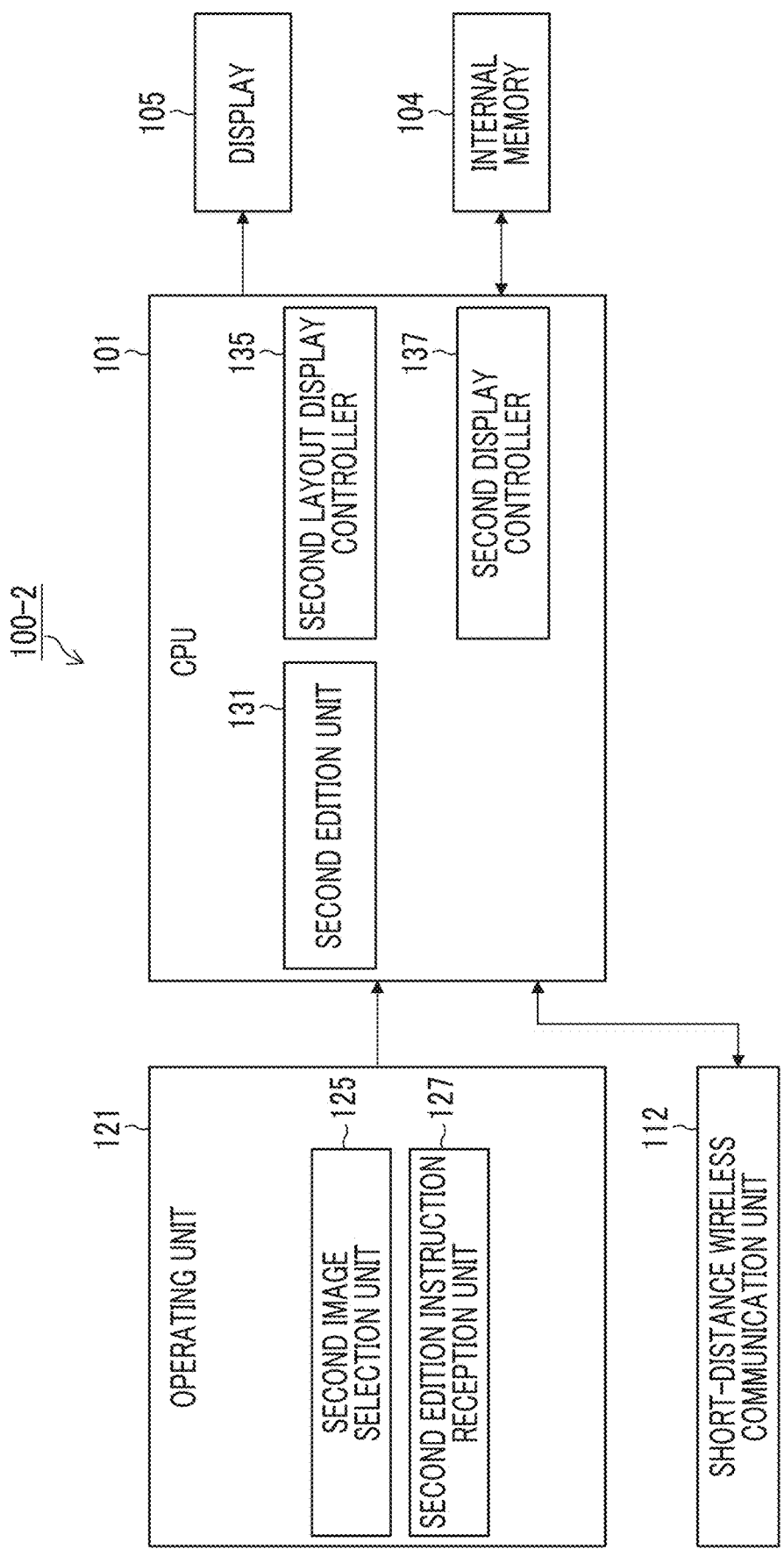
FIG. 5 is a block diagram showing principal functions of a portable terminal 100-2 functioning as a client of the first embodiment.

FIG. 5 is a block diagram showing principal functions of the portable terminal (second portable terminal) 100-2 functioning as a client of the first embodiment in the collage image creation system 1 shown in FIG. 1.

In a case where the "collage with everyone" button MB7 on the top screen 200 shown in FIG. 3 is touched, the screen of the display 105 is transited from the top screen 200 to a screen for selecting whether to participate in the creation of the collage image as a host or to participate in the creation of the collage image as a client. As an operation to participate in the creation of the collage image as a client is performed on the screen, thereafter, the portable terminal 100-2 functions as a client.

In the collage image creation system 1 shown in FIG. 1, since the portable terminal 100-1 functions as a host, other portable terminals 100-2 to 100-N can participate only as a client. In FIG. 5, although the portable terminal 100-2 among the portable terminals 100-2 to 100-N is shown, other portable terminals functioning as a client have the same function. In FIG. 5, portions common to the portable terminal 100-1 shown in FIG. 4 are represented by the same reference numerals, and detailed description thereof will not be repeated.

In FIG. 5, the portable terminal 100-2 functioning as a client is constituted of an operating unit 121 that has a touch pad 106 and the like, a CPU 101 that executes the collage image creation program to function as a second edition unit 131, a second layout display controller 135, and a second display controller 137, an internal memory 104, a display 105 that functions as a second display unit, and a short-distance wireless communication unit 112 that functions as a second communication unit.

The operating unit 121 includes a second image selection unit 125 and a second edition instruction reception unit 127. The portable terminal 100-2 of the example is not provided with the layout selection unit 122, the print instruction reception unit 128, and the image composition unit 132 unlike the portable terminal 100-1 as a host shown in FIG. 4. This is because the portable terminal 100-2 functioning as a client does not need to select a layout for collage image creation, and does not generate or print out the collage image.

The second image selection unit 125 and the second edition instruction reception unit 127 have the same functions as the first image selection unit 124 and the first edition instruction reception unit 126 shown in FIG. 4.

The second image selection unit 125 is an operating unit that selects an image (second image) for use in the creation of the collage image from a plurality of images stored in the internal memory 104 or the like. The second image selected by the second image selection unit 125 is added to the second display controller 137 and the like.

The second edition instruction reception unit 127 is an operating unit that performs an edition instruction to the selected second image, and for example, instructs magnification, reduction, movement, and rotation for trimming the second image or instructs image processing contents on the second image.

The second layout display controller 135 makes the display 105 display the layout based on information regarding the layout for collage image creation received from the portable terminal 100-1 as a host through the short-distance wireless communication unit 112.

The second display controller 137 makes the second image selected by the second image selection unit 125 be displayed within the second frame allocated to the portable terminal 100-2 among a plurality of frames of the layout displayed on the display 105. In a case where the second image is edited by the second edition unit 131, the second image after edition is displayed within the second frame. With this, it is possible to allow the user to confirm an edition result of the second image.

The short-distance wireless communication unit 112 receives information regarding the layout and the first image from the portable terminal 100-1, transmits the selected second image to the portable terminal 100-1, and in a case where the second image is edited by the second edition unit 131, transmits the second image after edition or edition information indicating an edition content to the portable terminal 100-1.

Collage Image Creation Method of First Embodiment

Figure 7A:
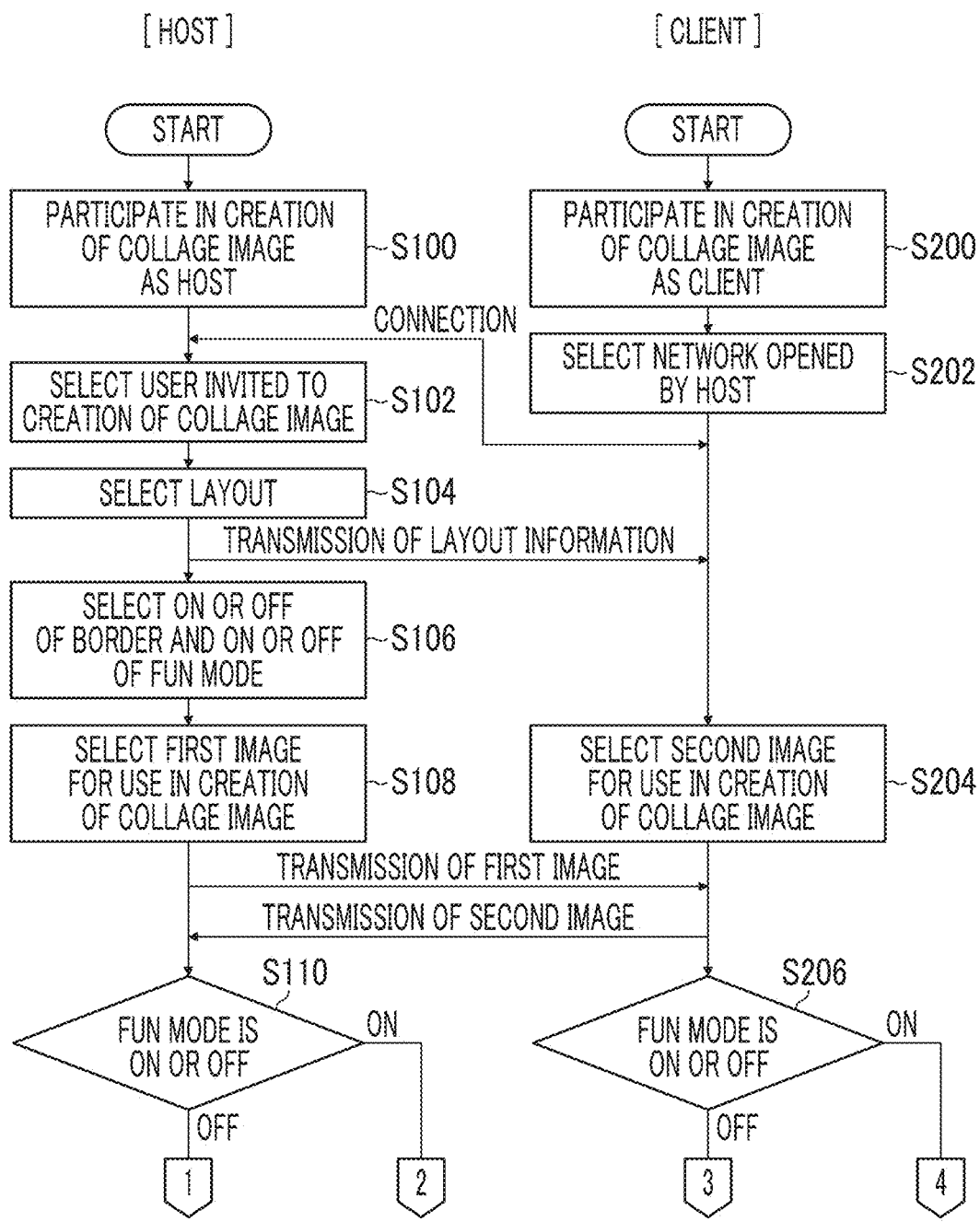
FIG. 7A is a part of a flowchart showing a collage image creation method according to the first embodiment of the invention.
Figure 7B:
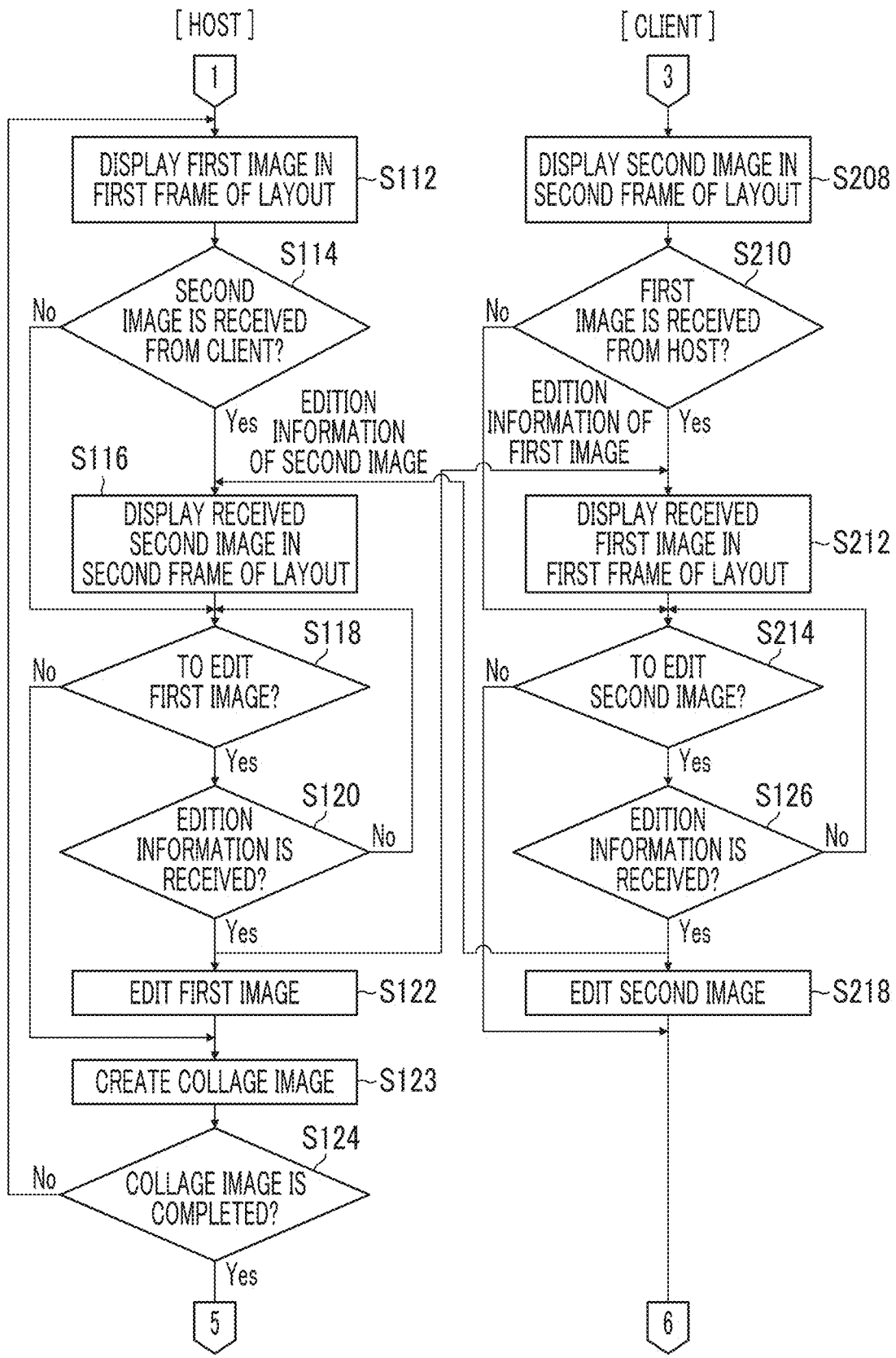
FIG. 7B is a flowchart subsequent to the flowchart shown in FIG. 7A.
Figure 7C:
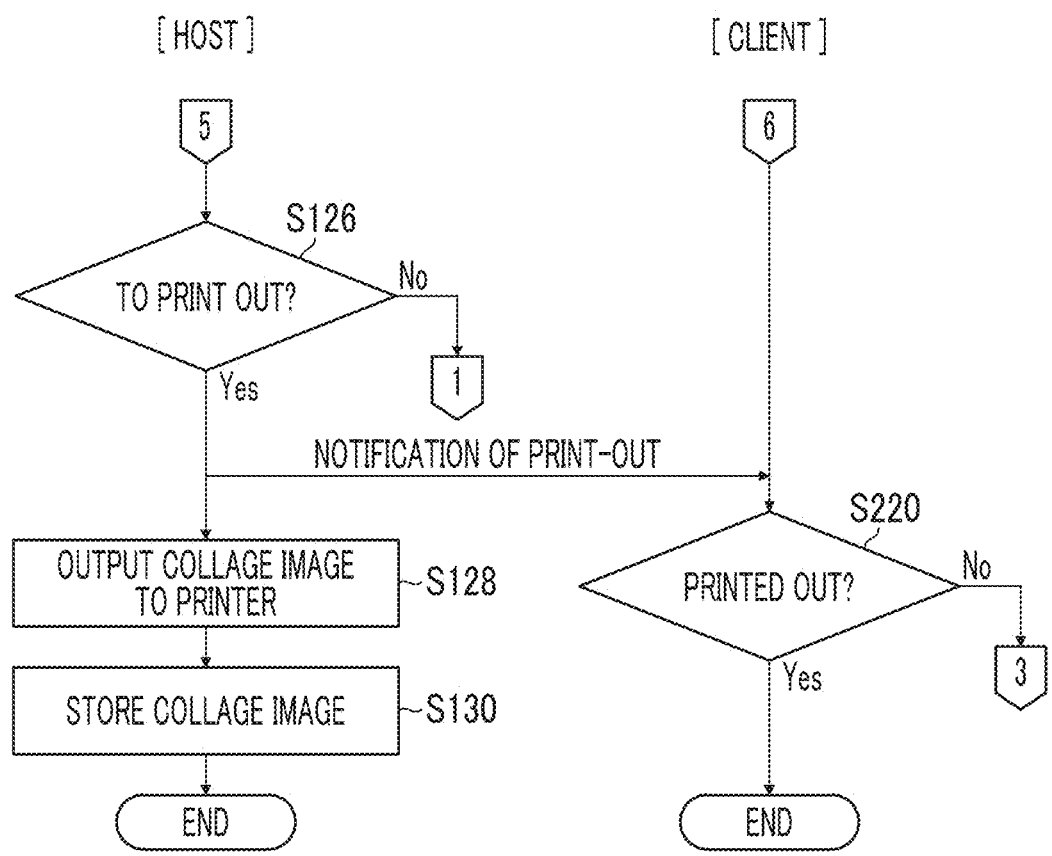
FIG. 7C is a flowchart subsequent to the flowchart shown in FIG. 7B.

FIGS. 7A to 7C are flowcharts showing a collage image creation method according to the first embodiment of the invention. The collage image creation method of the first embodiment shows a method that is carried out by the collage image creation system constituted of the portable terminals 100-1, 100-2, and the like of the first embodiment shown in FIGS. 4 and 5.

In FIG. 7A, the user of the portable terminal 100-1 executes application software including the collage image creation program, makes the display 105 of the portable terminal 100-1 display the top screen 200 (FIG. 3), and touches the "collage with everyone" button MB7 on the top screen 200.

In a case where the "collage with everyone" button MB7 is touched, a menu (not shown) for selecting whether to participate in "collage with everyone" as a host or to participate in "collage with everyone" as a client is displayed on the display 105 of the portable terminal 100-1.

The user of the portable terminal 100-1 of the example touches an icon button (function selection unit) indicating participation in creation of a collage image as a host (Step S100). With this, thereafter, the portable terminal 100-1 functions as a "host" in the creation of the collage image as shown in FIG. 4.

On the other hand, in a case where the user of one or more other portable terminals (for example, the portable terminal 100-2) also touches the "collage with everyone" button MB7 on the top screen 200, the screen of the display 105 is transited to a screen for selecting whether to participate as a host in the creation of the collage image or to participate as a client in the creation of the collage image. The user of the portable terminal 100-2 of the example touches an icon button (function selection unit) indicating the participation in the creation of the collage image as a client on the screen (Step S200). With this, thereafter, the portable terminal 100-2 functions as a "client" in the creation of the collage image as shown in FIG. 5. The user of the portable terminal 100-2 cannot participate as a host in the same group as the user of the portable terminal 100-1 functioning as a host.

Subsequently, the user of the portable terminal 100-2 that participates as a client selects a network (in this example, Bluetooth (Registered Trademark)) that is opened by the portable terminal 100-1 functioning as a host (Step S202). With this, Bluetooth connection is established between the portable terminal 100-1 functioning as a host and the portable terminal 100-2 functioning as a client, and wireless communication becomes possible between both portable terminals.

Subsequently, the user of the portable terminal 100-1 functioning as a host selects a user who is invited to (participates in) the creation of the collage image (Step S102).

Figure 9:
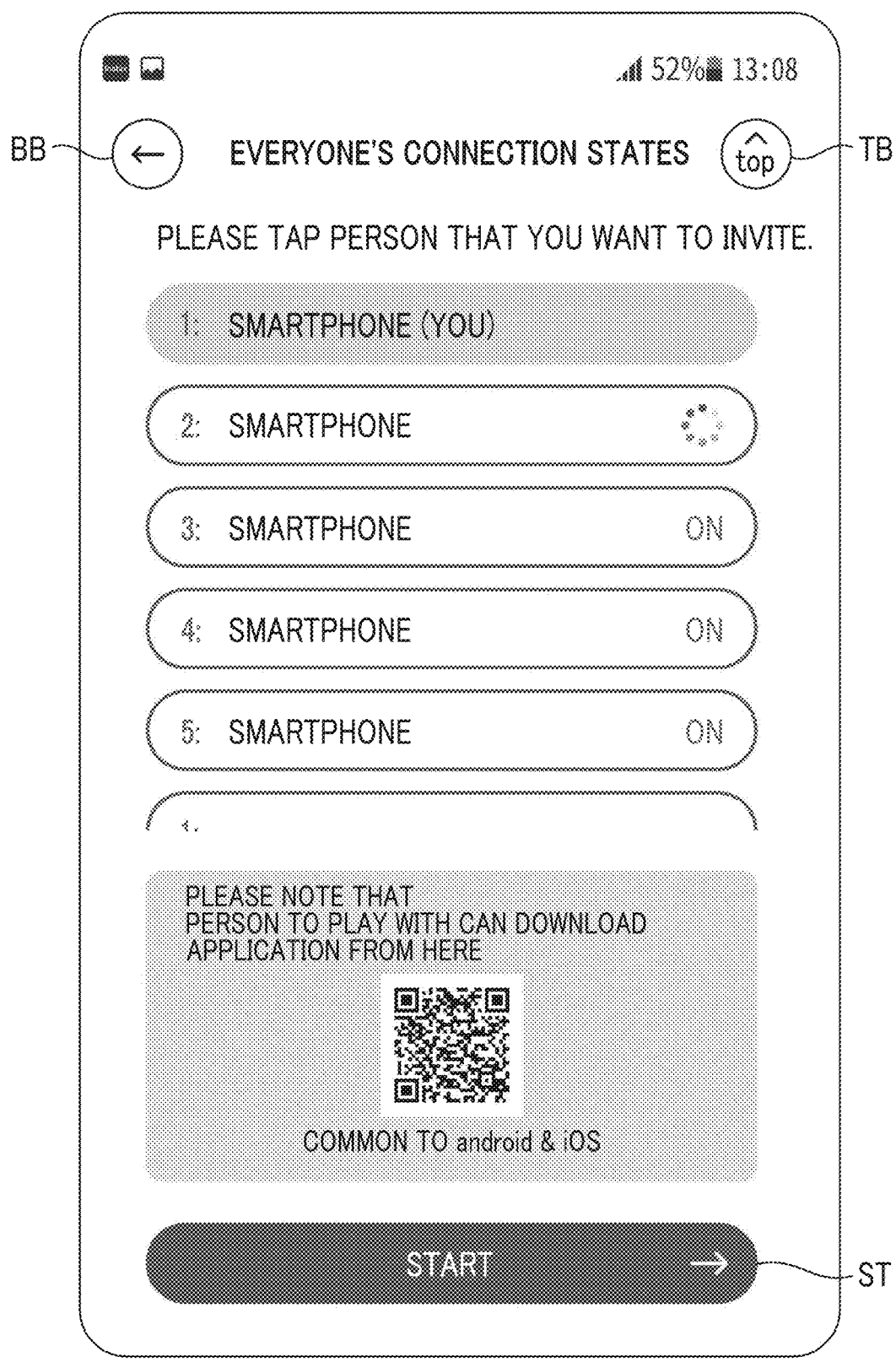
FIG. 9 is a diagram showing an example of a screen of the portable terminal 100-1 in a case where another user is invited.

FIG. 9 is a diagram showing an example of a screen of the portable terminal 100-1 in a case where another user is invited. The user of the portable terminal 100-1 touches the icon button corresponding to the user to be invited among the icon buttons indicating the communicable portable terminals of other users on the screen, and then, touches a "start" button ST to decide the user who creates the collage image.

In FIG. 9, reference numeral BB represents a "back" button, and reference numeral TB represents a "top" button. The "back" button BB is a button that is used to give an instruction to return to a previous screen. The "top" button TB is a button that is used to give an instruction to return to the top screen 200.

Figure 10:
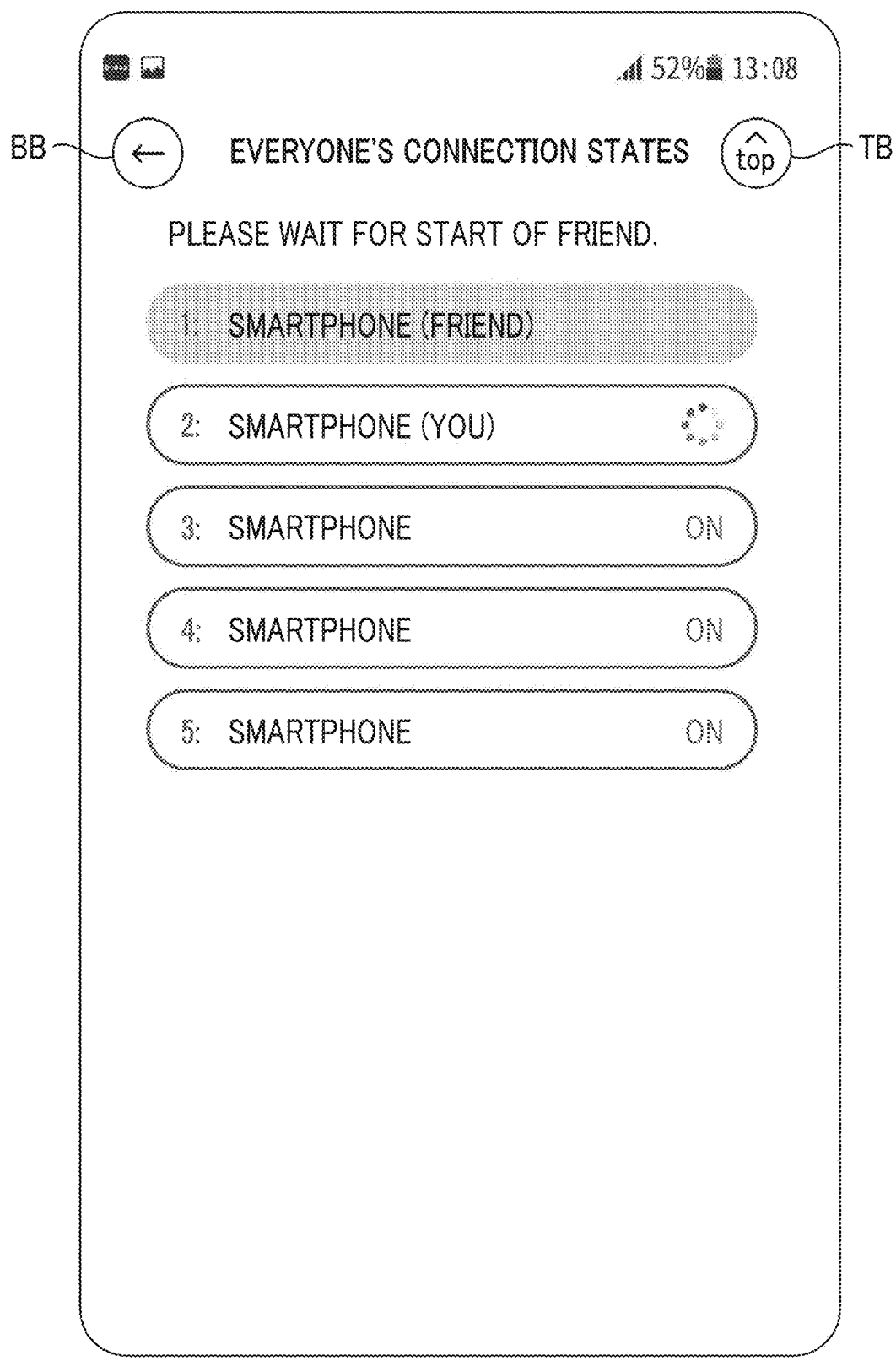
FIG. 10 is a diagram showing an example of a screen that is displayed on portable terminals 100-2 and 100-3 until a user who participates in creation of a collage image is decided on the portable terminal 100-1 side.

FIG. 10 is a diagram showing an example of a screen that is displayed on the portable terminal functioning as a client until a user who participates in the creation of the collage image is decided on the portable terminal side functioning as a host. The display of the screen can be omitted. In the example, description will be provided assuming that two users of the portable terminals 100-2 and 100-3 are invited.

Next, the user of the portable terminal 100-1 functioning as a host selects a layout for collage image creation (Step S104). That is, the user operates the layout selection unit 122 (FIG. 4) to select one layout from among a plurality of layouts for collage image creation stored in the internal memory 104 or the like.

Figure 11:
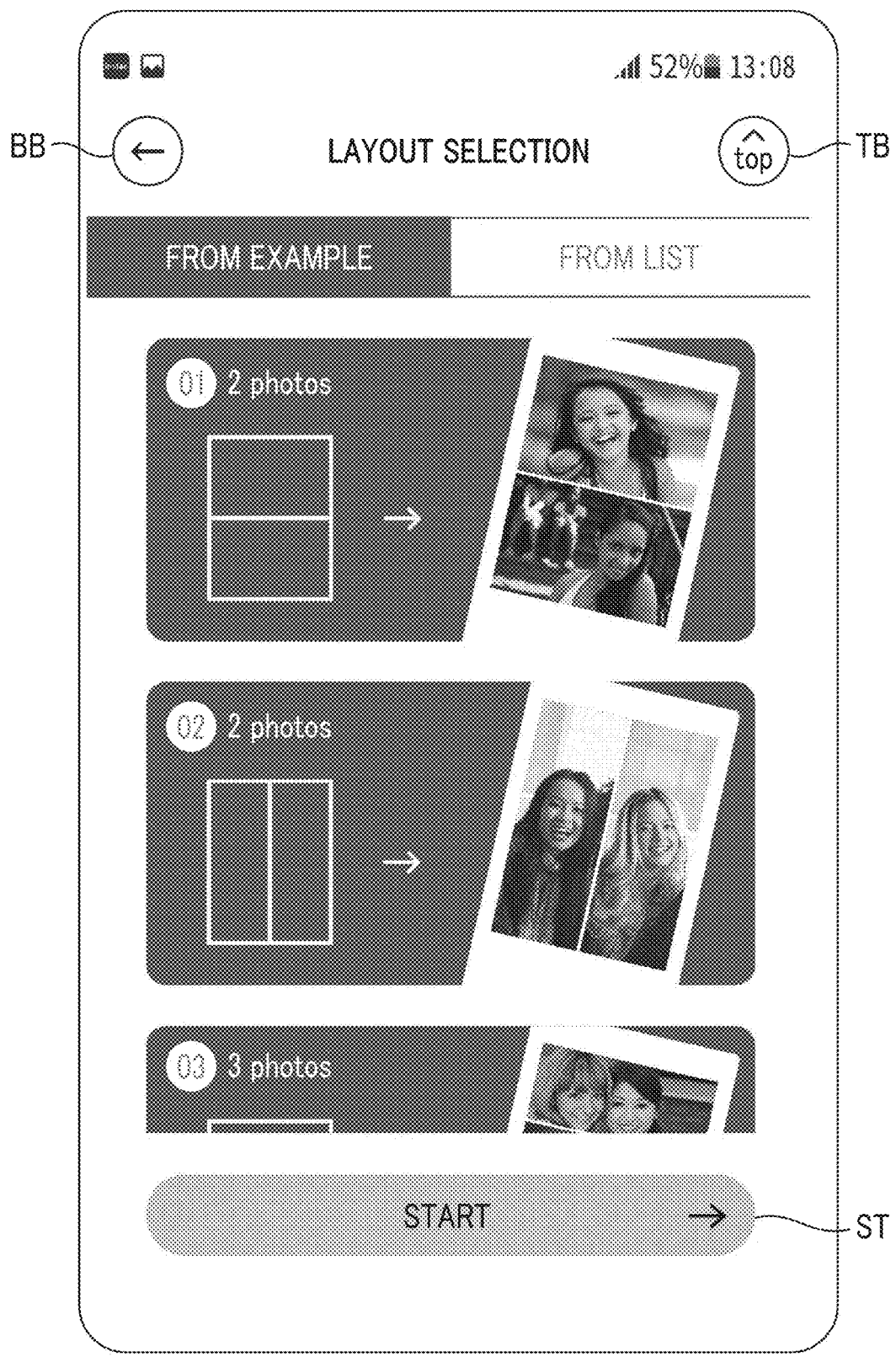
FIG. 11 is a diagram showing an example of a screen that is displayed on the portable terminal 100-1 in a case where a layout is selected.

FIG. 11 is a diagram showing an example of a screen that is displayed on the portable terminal 100-1 in selecting a layout.

The user of the portable terminal 100-1 selects a desired layout from among layouts having the number of divisions corresponding to the number of users (including the user of the portable terminal 100-1) who participate in the creation of the collage image. Here, the number of divisions is the number of areas in dividing one frame into a plurality of areas, and corresponds to the number of photographs to be used to create the collage image.

The user touches the desired layout on the screen shown in FIG. 11 and touches the "start" button ST to select the layout for collage image creation. In the example, since the two users are invited to the creation of the collage image, a layout having the number of divisions for three persons including the user of the portable terminal 100-1 is selected.

In a case where the layout for collage image creation is decided, the portable terminal 100-1 functioning as a host transmits information regarding the layout (hereinafter, referred to as "layout information") indicating the layout to the portable terminals 100-2 and 100-3 functioning as a client through the short-distance wireless communication unit 112.

In a case where the layout for collage image creation is selected, a screen for use in the creation of the collage image including the layout is displayed on the portable terminal 100-1 functioning as a host.

Figure 12:
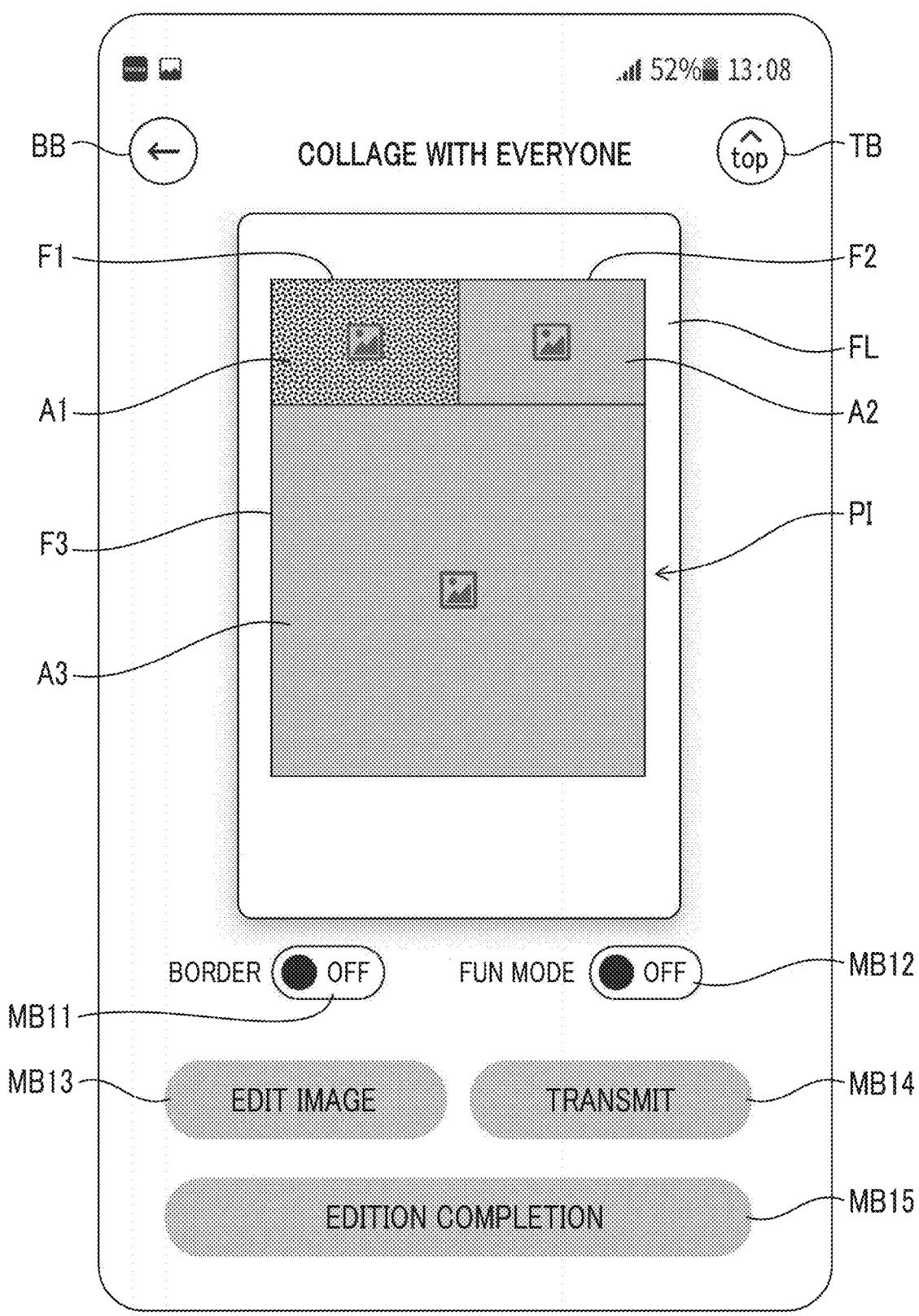
FIG. 12 is a diagram showing an example of a screen for use in creation of a collage image to be displayed on the portable terminal 100-1.
Figure 13:
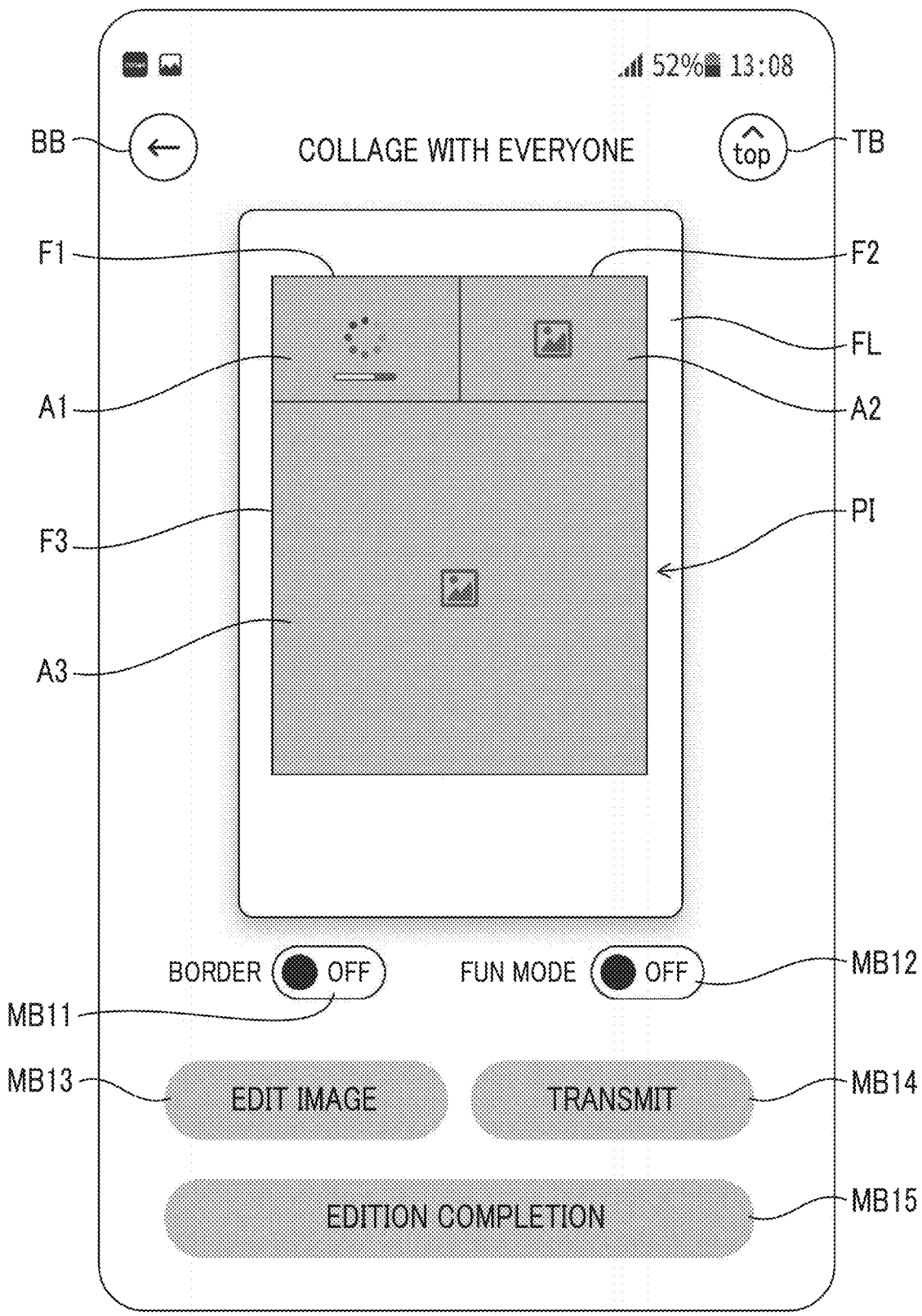
FIG. 13 is a diagram showing a screen corresponding to FIG. 12, and is a diagram showing that a first image is being read with selection of the first image.

FIG. 12 is a diagram showing an example of the screen for use in the creation of the collage image that is displayed on the portable terminal 100-1 functioning as a host.

An area PL indicating the instant film 12 shown in FIG. 6 is displayed in a center portion of the screen shown in FIG. 12, and an area PI where an image is printed is displayed inside the area PL.

The first layout display controller 134 makes the display 105 display the layout based on information regarding the selected layout.

The layout of the example is constituted of three frames F1, F2, and F3 that define the area P1. Here, an area. A1 of the frame F1 of the layout is an area allocated for a host, areas A2 and A3 of the two frames F2 and F3 (second frames) are areas allocated for a client, and images of the users of the portable terminals 100-1, 100-2, and 100-3 are composed (fitted) within the frames F1, F2, and F3 (the areas A1, 42, and A3).

On the screen of the portable terminal 100-1 functioning as a host, the area A1 allocated to the portable terminal 100-1 and the areas A2 and A3 allocated to other users are displayed to be identifiable from each other.

Below the area PL indicating the instant film 12, a "border" button MB11 that is used to select whether or not to print the frame (border) of the layout and a "fun mode" button MB12 that is used for ON or OFF of the selection of the fun mode are provided.

The "fun mode" button MB12 functioning as a mode selection unit is a button that is used to select a mode (first mode) in which an image of the user displayed on the display 105 is displayed on the portable terminals of other users, and a mode (second mode) in which the image of the user is not displayed on the portable terminals of other users. Accordingly, in a case where the fun mode is selected to be ON, until the collage image is printed by the printer 10, each user cannot confirm an image other than the image of the user, and can enjoy unexpectedness of the printed-out collage image.

The user of the portable terminal 100-1 that participates as a host selects the ON or OFF of the border and the ON or OFF of the fun mode using the "border" button MB11 and the "fun mode" button MB12 (Step S106). In the example shown in FIG. 12, border OFF and fun mode OFF are selected.

Next, the user of the portable terminal 100-1 functioning as a host selects an image (first image) for use in the creation of the collage image from among a plurality of images stored in the internal memory 104 of the portable terminal 100-1 (Step S108). That is, the user selects the first image for use in the creation of the collage image from among a plurality of images stored in the internal memory 104 or the like through an image selection operation with the first image selection unit 124 (FIG. 4).

On the other hand, the user of each of the portable terminals 100-2 and 100-3 functioning as a client selects an image (second image) for use in the creation of the collage image from a plurality of images stored in the internal memory 104 or the like through an image selection operation with the second image selection unit 125 (FIG. 5) (Step S204).

In the example, in a case where the first image is selected in Step S108, the selected first image is transmitted from the portable terminal 100-1 to the portable terminals 100-2 and 100-3, and in a case where the second images are selected in Step S204, the selected second images are transmitted from the portable terminals 100-2 and 100-3 to the portable terminal 100-1; however, the invention is not limited thereto, in a case where the edition of the image selected in each portable terminal is completed, and the "edition completion" button MB15 is operated, transmission and reception of the images selected for the creation of the collage images may be performed among the portable terminals.

Since the portable terminals 100-2 and 100-3 functioning as a client receive the layout information from the portable terminal 100-1, the second layout display controller 135 (FIG. 5) can make the display 105 display the same screen as in FIG. 12. It is preferable that the portable terminal 100-2 or 100-3 displays the frame F2 or F3 (the area A2 or A3) of the layout allocated to the portable terminal to be identifiable.

Next, the portable terminal 100-1 functioning as a host and the portable terminals 100-2 and 100-3 functioning as a client are transited to processing shown in FIG. 7B in a case where the fun mode is OFF (Step S110 and Step S206).

Figure 14:
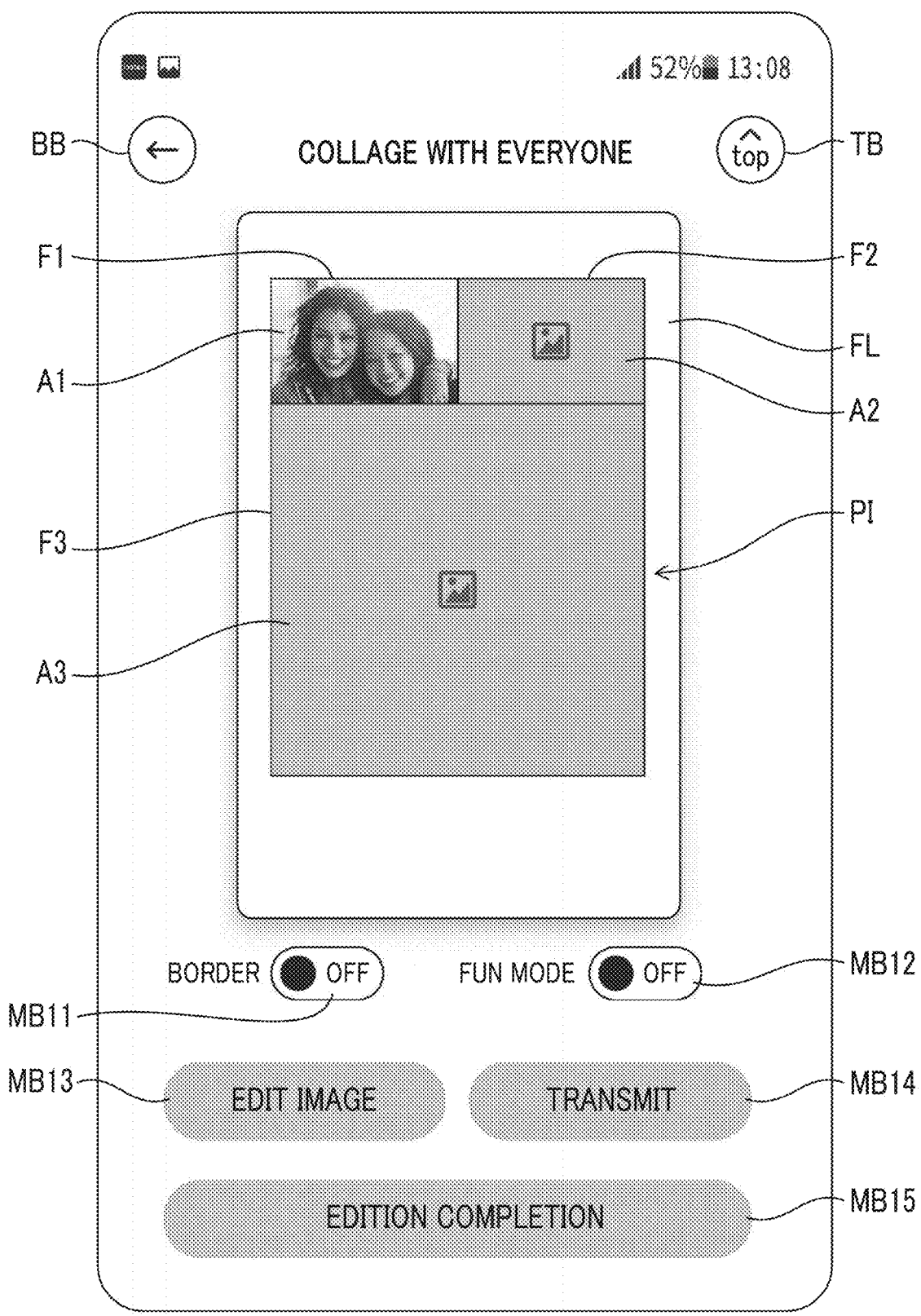
FIG. 14 is a diagram showing a screen corresponding to FIG. 12, and is a diagram showing a state in which the selected first image is composed in a first frame of a layout.

In FIG. 7B, the first display controller 136 of the portable terminal 100-1 functioning as a host makes the first image selected in Step S108 be displayed within the frame F1 of the layout (Step S112). That is, the first image selected in Step S108 is read from the internal memory 104 (FIG. 3), and is composed in the area A1 within the frame F1 of the layout allocated to the portable terminal 100-1 (FIG. 14).

The second display controller 137 of each of the portable terminals 100-2 and 100-3 functioning as a client makes the second image selected in Step 204 be displayed in the corresponding second frame (the frame F2 or F3) of the layout (Step S208).

Subsequently, the portable terminal 100-1 functioning as a host determines whether or not the second images for use in the creation of the collage image are received from the portable terminals 100-2 and 100-3 functioning as a client (Step S114), and in a case where the second images are received (in a case of "Yes"), the first display controller 136 makes the received second images be displayed within the corresponding frames F2 and F3 of the layout (Step S116).

Similarly, each of the portable terminals 100-2 and 100-3 functioning as a client determines whether or not the first image for use in the creation of the collage image is received from the portable terminal 100-1 functioning as a host (Step S210), and in a case where the first image is received (in a case of "Yes"), the second display controller 137 makes the received first image be displayed within the corresponding frame F1 of the layout (Step S212).

Next, the portable terminal 100-1 functioning as a host determines whether or not to edit the first image (Step S118).

As shown in FIG. 14 or the like an "edit image" button MB13, a "transmit" button MB14, and an "edition completion" button MB15 are provided in a lower portion of the screen of the portable terminal 100-1. In a case where the "edit image" button MB13 is touched, the portable terminal 100-1 determines to edit the first image and makes transition to a screen for edition (not shown).

On the screen for edition, various icon buttons for edition functioning as the first edition instruction reception unit 126 are displayed. As the icon buttons for edition, a button that is used to give an instruction of magnification, movement, and rotation for trimming the first image, and a button that is used to give an instruction of image processing contents (various kinds of filter processing, brightness adjustment, contrast adjustment, saturation adjustment, and the like) on the first image can be included.

The first edition unit 130 determines whether or not an icon button for edition is operated (Step S120). In a case where the icon button for edition is operated (in a case of "Yes"), the first edition unit 130 receives information (edition information) regarding edition to the first image according to the operation of the icon button for edition (Step S120), and edits the first image based on the edition information (Step S122).

The edition information to the first image received in Step S120 is transmitted to the portable terminals 100-2 and 100-3 functioning as a client. The edition information to the first image is used in editing the first image within the frame F1 of the layout displayed on the display 105 of each of the portable terminals 100-2 and 100-3.

Similarly, each of the portable terminals 100-2 and 100-3 functioning as a client determines whether or not to edit the second image (Step S214). The same screen as the screen shown in FIG. 14 is displayed on the screen of each of the portable terminals 100-2 and 100-3, and in a case where the "edit image" button MB13 is touched, each of the portable terminals 100-2 and 100-3 determines to edit the second image and makes transition to a screen for edition.

On the screen for edition, various icon buttons for edition functioning as the second edition instruction reception unit 127 are displayed. The second edition unit 131 (FIG. 5) determines Whether or not an icon button for edition is operated (Step S214). In a case where the icon button for edition is operated (in a case of "Yes"), the second edition unit 131 receives edition information to the second image according to the operation of the icon button for edition (Step S216), and edits the second image based on the edition information (Step S218).

The edition information to the second image received in Step S216 is transmitted to the portable terminal 100-1 functioning as a host. The edition information to the second image is used in editing the second image on the portable terminal 100-1 side in a case where the collage image is created using the second image or is used in editing the second images within the frames F2 and F3 of the layout displayed on the display 105 of the portable terminal 100-1.

The portable terminal 100-1 functioning as a host may transmit the first image after edition to the portable terminals 100-2 and 100-3 again, instead of transmitting the edition information to the first image to each of the portable terminals 100-2 and 100-3 functioning as a client. Each of the portable terminals 100-2 and 100-3 functioning as a client may transmit the second image after edition to the portable terminal 100-1 again, instead of transmitting the edition information to the second image to the portable terminal 100-1 functioning as a host. The first image that is transmitted from the portable terminal 100-1 to each of the portable terminals 100-2 and 100-3 is used to be composed within the frame F1 of the layout displayed on the display 105 of each of the portable terminals 100-2 and 100-3. Thus, it is preferable to transmit the first image having a small image size.

Subsequently, the image composition unit 132 of the portable terminal 100-1 functioning as a host composes the first image of the portable terminal 100-1 within the frame F1 of the layout and composes the second images received from the portable terminals 100-2 and 100-3 functioning as a client within the frames F2 and F3 of the layout to create the collage image (Step S123).

Here, in a case where the edition of the first image or the second image is performed in the creation of the collage image, the image composition unit 132 creates a collage image reflecting the edition result.

Figure 15:
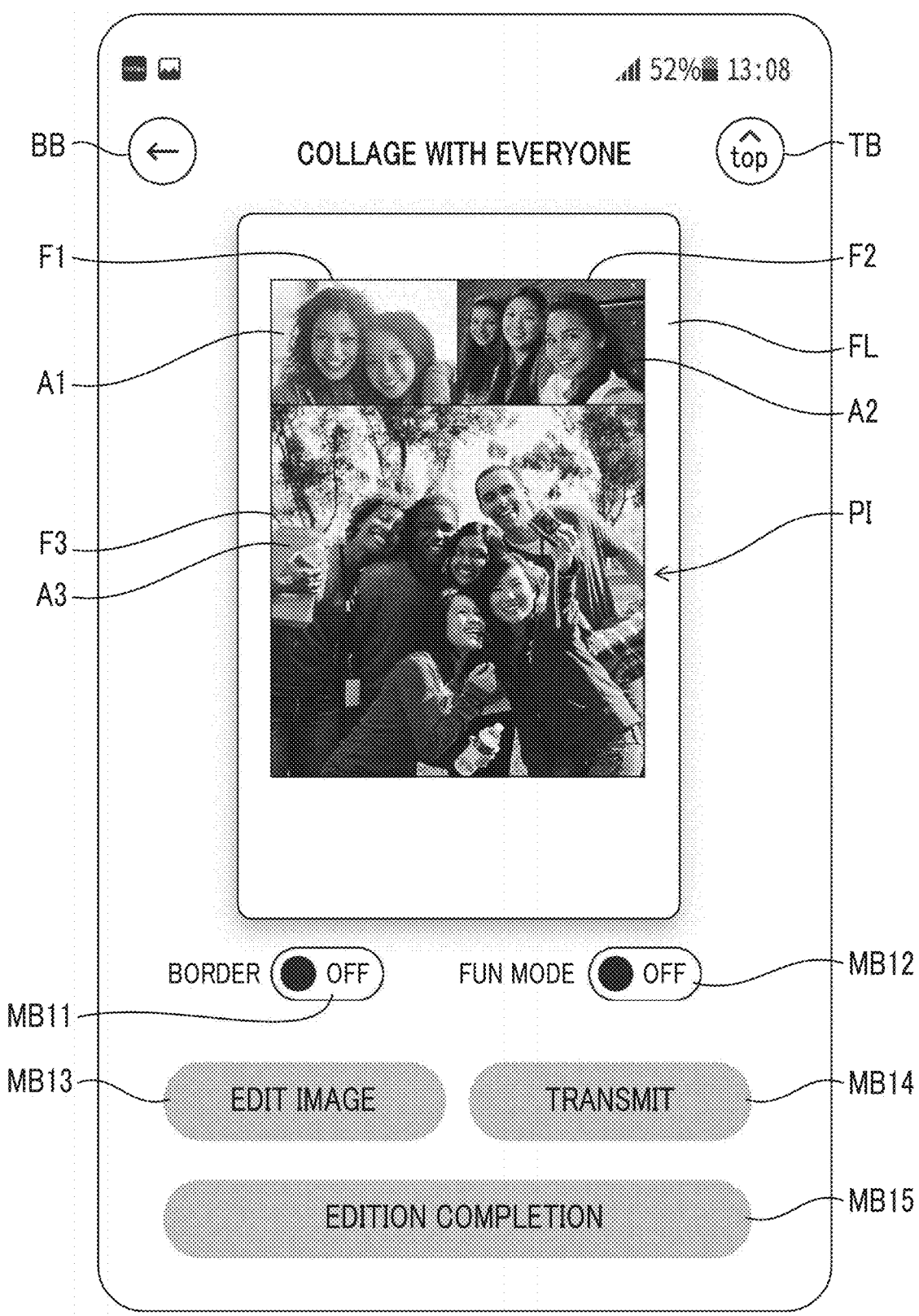
FIG. 15 is a diagram showing a screen corresponding to FIG. 12, and is a diagram showing a state in which the first image and two second images are composed in all frames of the layout.

Next, the portable terminal 100-1 functioning as a host determines whether or not the collage image is completed (Step S124). As shown in FIG. 15, in a case where the first image and the second images are composed within all frames F1, F2, and F3 of the layout, and the "edition completion" button MB15 or the like is operated, determination can be made that the collage image is completed.

In Step S124, in a case where determination is made that the collage image is completed (in a case of "Yes"), as shown in FIG. 7C, determination is made whether or not to print out the collage image (Step S126).

In a case where a "print" button (not shown) on the display 105 is operated, determination can be made to print out the collage image. Then, in printing out the collage image (in a case where the "print" button is operated), the portable terminal 100-1 establishes wireless connection with the printer 10 as shown in FIG. 6, and then, transmits the collage image to the printer 10 (Step S128).

The portable terminal 100-1 stores the collage image in the internal memory 104 so as to be printable again after the collage image is printed out (Step S130).

In a case where determination is made to print out in Step S126, notification indicating print-out is given to the portable terminals 100-2 and 100-3 functioning as a client.

In the portable terminals 100-2 and 100-3, determination is made whether or not the collage image is printed out based on the notification indicating print-out received from the portable terminal 100-1 (Step S220), and in a case where the collage image is printed out (in a case of "Yes"), the processing in the portable terminals 100-2 and 100-3 ends.

On the other hand, in Step S220, in a case Where determination is made that the collage image is not printed out (in a case of "No"), the process is transited to Step S208 shown in FIG. 7B. With this, the user of each of the portable terminals 100-2 and 100-3 functioning as a client can continuously perform the edition of the second image.

Next, a case where the fun mode is ON will be described.

Figure 16:
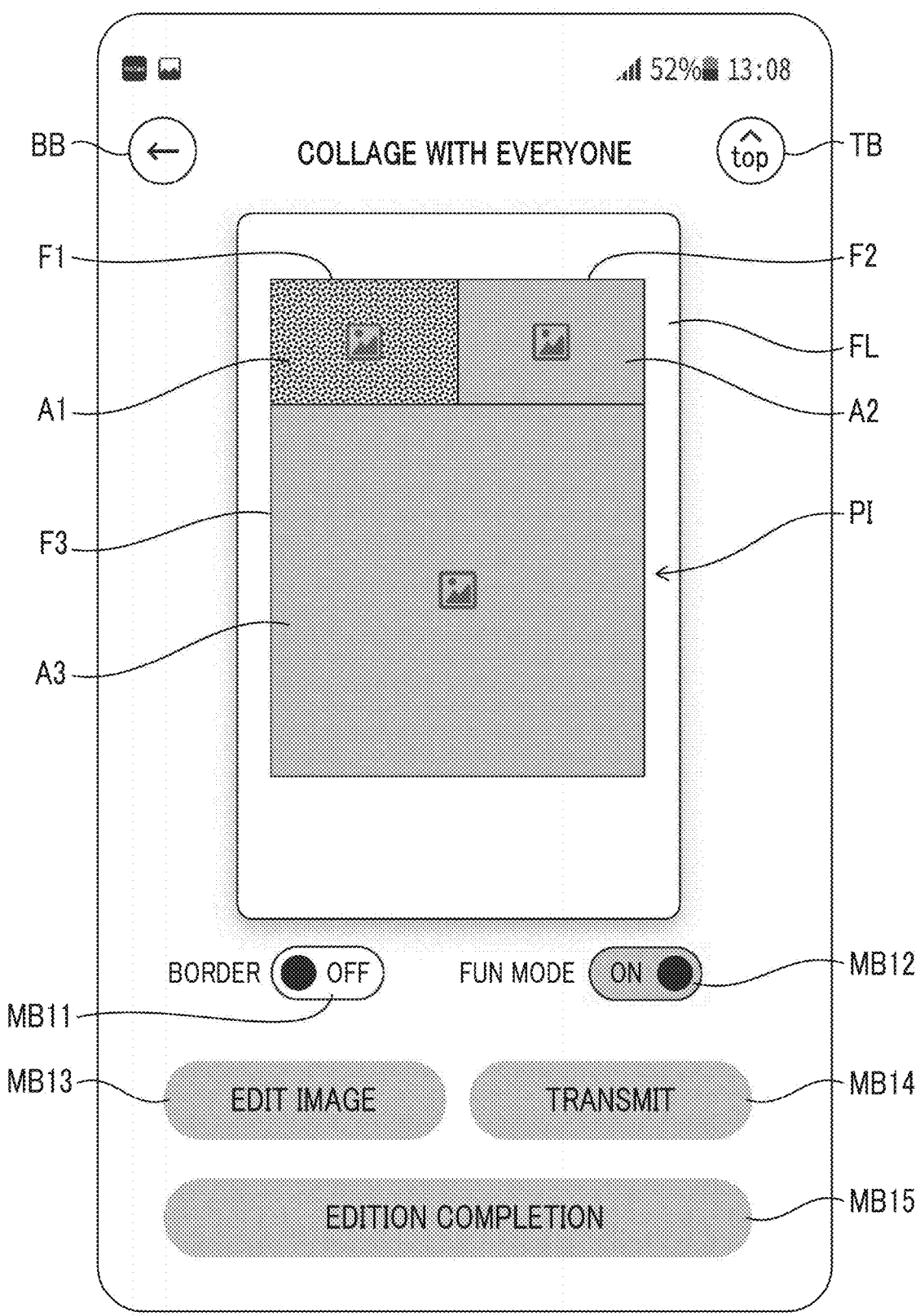

FIG. 16 is a diagram showing another example of a screen for use in the creation of the collage image that is displayed on the portable terminal 100-1 functioning as a host, and shows a case where the fun mode is ON by the "fun mode" button MB12.

Figure 8:
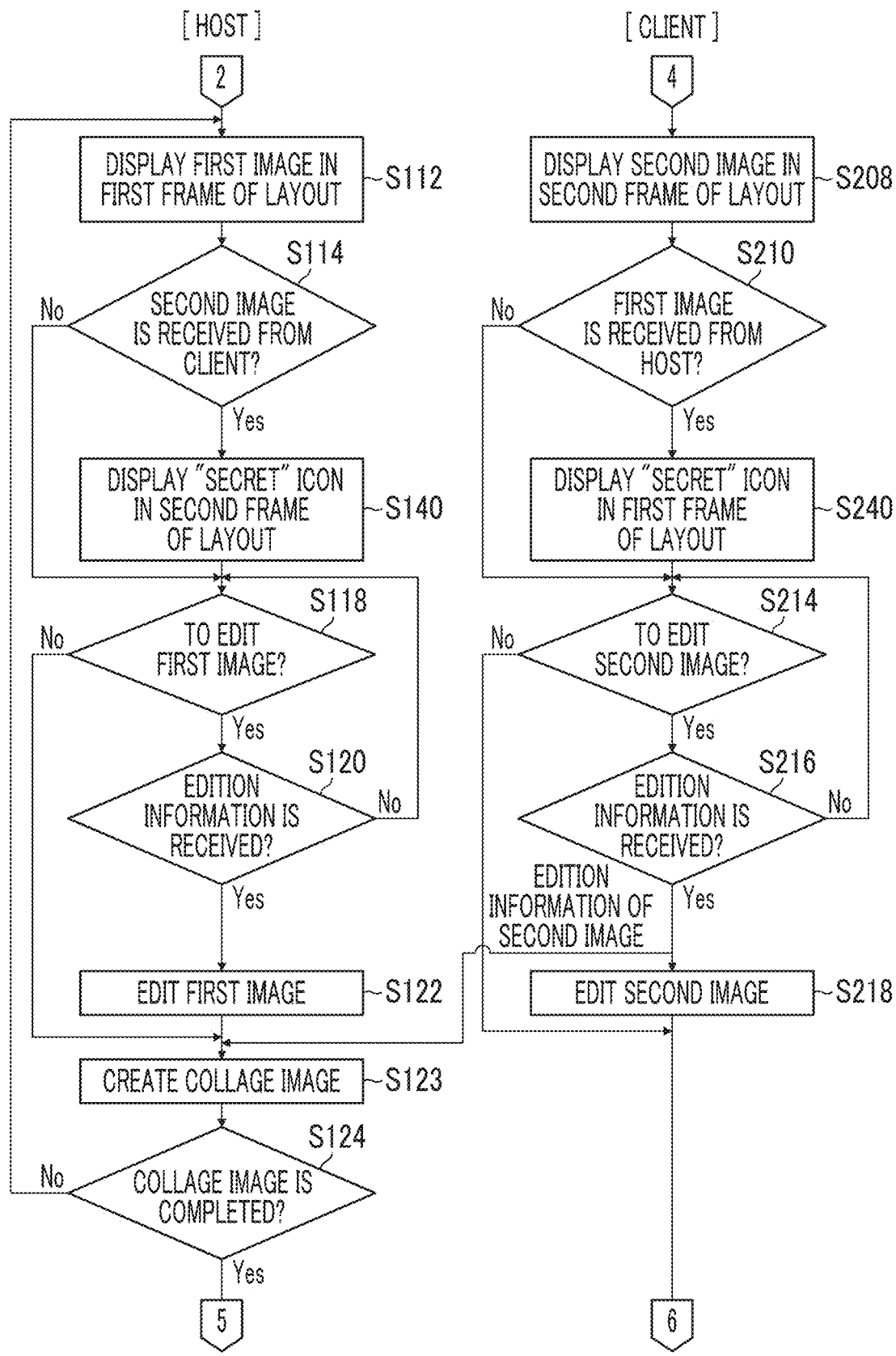
FIG. 8 is a flowchart in a case where a fun mode is ON, and is a flowchart in place of the flowchart shown in FIG. 7B.

In Step S110 and Step S206 shown in FIG. 7A, in a case where determination is made that the fun mode is ON, the process is transited to Step S112 and Step S208 shown in FIG. 8. In FIG. 8, the steps common to FIG. 7B are represented by the same step numbers, and detailed description thereof will not be repeated.

Figure 17:
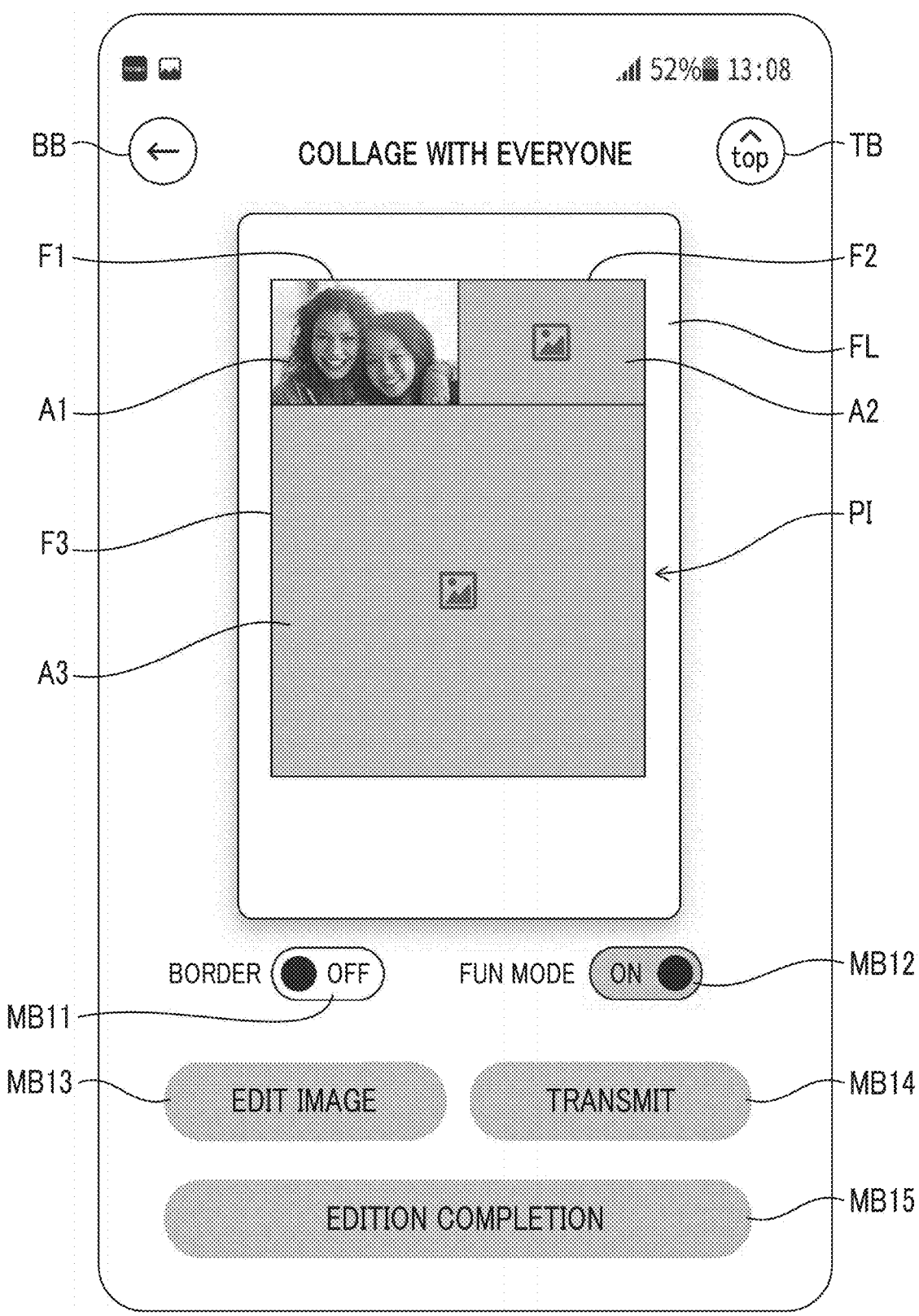
FIG. 17 is a diagram showing an example of a screen for use in creation of a collage image to be displayed on the portable terminal 100-1, and is a diagram showing a state in which the fun mode is ON, and the first image is selected by the portable terminal 100-1.

In Step S112 of FIG. 8, the first display controller 136 of the portable terminal 100-1 functioning as a host makes only the first image selected in Step S108 be displayed within the frame F1 of the layout (see FIG. 17).

In Step S114, in a case where determination is made that the second image for use in the creation of the collage image is received from each of the portable terminals 100-2 and 100-3 functioning as a client (in a case of "Yes"), the first display controller 136 does not make the received second images be displayed within the corresponding frames F2 and F3 of the layout, and makes a "SECRET" icon indicating that the second image is in secret be displayed (Step S140).

Figure 18:
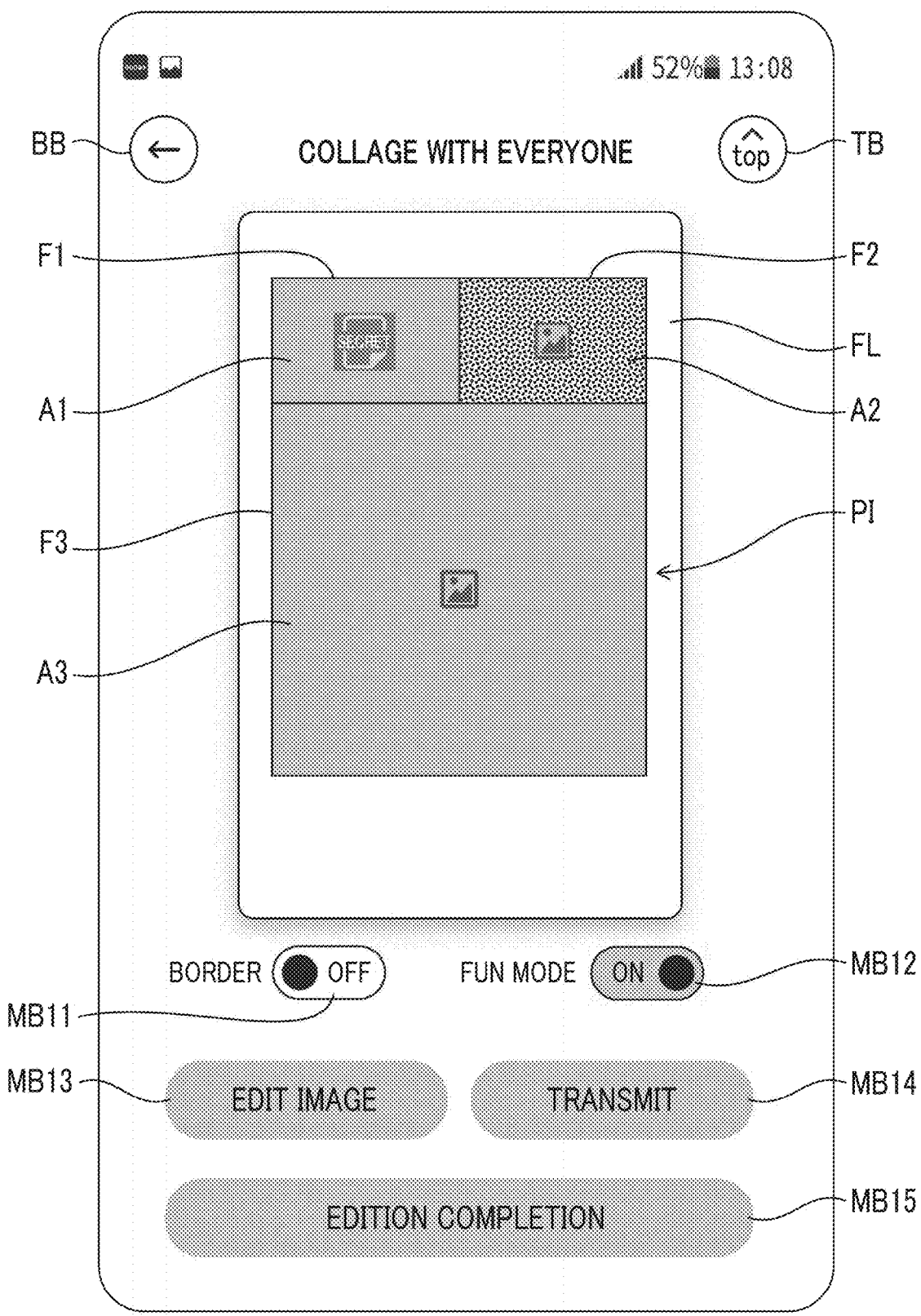
FIG. 18 is a diagram showing an example of a screen for use in creation of a collage image to be displayed on the portable terminal 100-2, and is a diagram showing a state in which the fun mode is ON, and the first image is selected by the portable terminal 100-1.

On the other hand, in Step S210 of FIG. 8, in a case where determination is made that the first image for use in the creation of the collage image is received from the portable terminal 100-1 functioning as a host (in a case of "Yes"), the second display controller 137 of each of the portable terminals 100-2 and 100-3 functioning as a client does not make the received first image be displayed within the corresponding frame F1 of the layout, and makes the "SECRET" icon indicating that the first image is in secret be displayed (Step S240, see FIG. 18).

In a case where the fun mode is ON, the portable terminal 100-1 functioning as a host may not transmit the first image to the portable terminals 100-2 and 100-3 functioning as a client, and may transmit information indicating that the first image is selected (the first image is kept secret). The second display controller 137 of each of the portable terminals 100-2 and 100-3 that receive information makes the "SECRET" icon indicating that the first image is in secret be displayed within the frame F1 of the layout.

Figure 19:
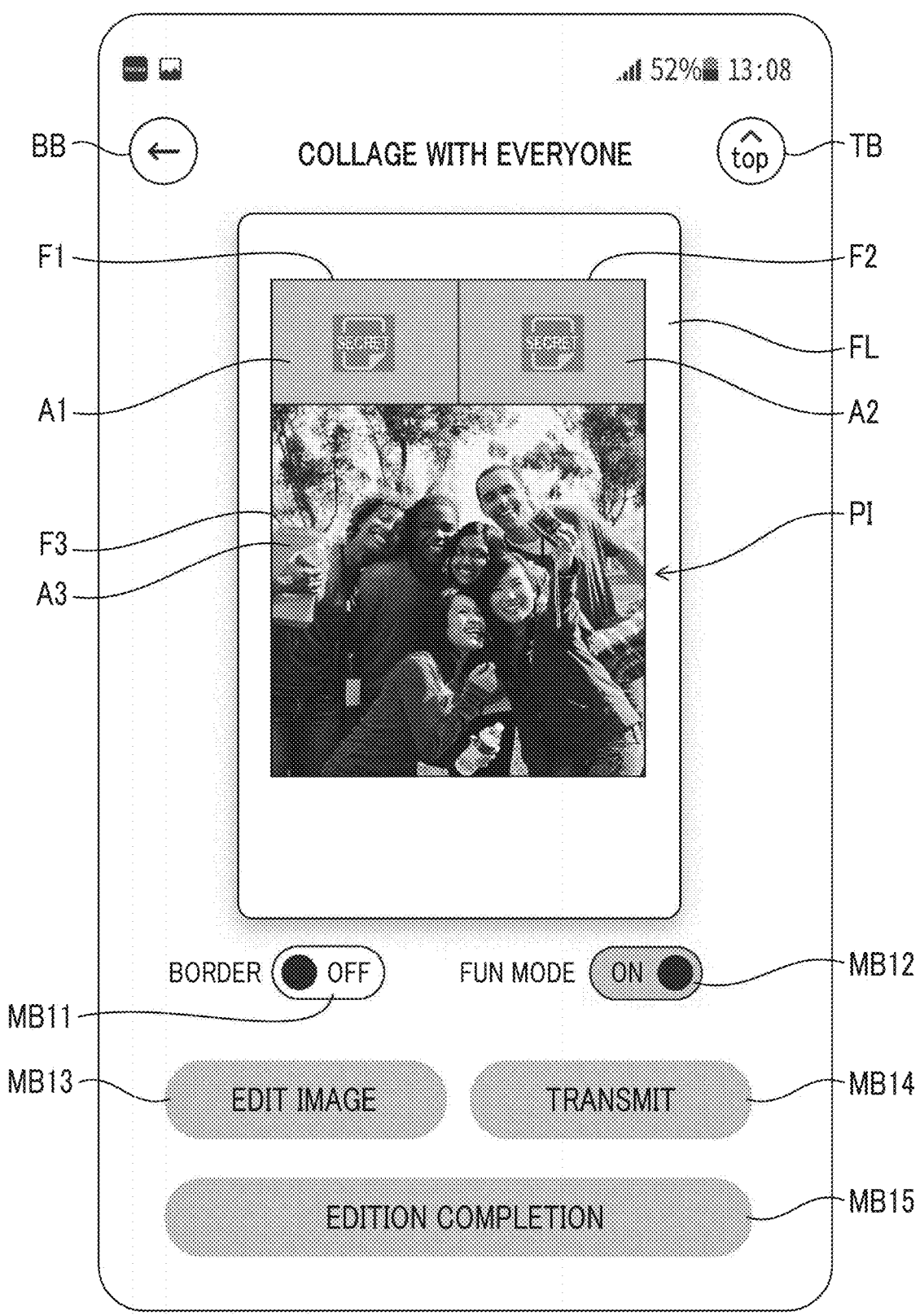
FIG. 19 is a diagram showing an example of a screen for use in creation of a collage image to be displayed on the portable terminal 100-3, and is a diagram showing a state in which the fun mode is ON, the first image is selected by the portable terminal 100-1, and the second image is selected by the portable terminal 100-2.

FIG. 19 is a diagram showing an example of a screen for use in the creation of the collage image that is displayed on the portable terminal 100-3 functioning as a client, and shows a case where the fun mode is ON.

In a case where the first image is selected by the portable terminal 100-1, and the second image is selected by the portable terminal 100-2, the portable terminal 100-3 functioning as a client displays only the second image selected by the second image selection unit 125 within the frame F3 of the layout on the display 105, and makes the "SECRET" icon be displayed within the frames F1 and F2 of the layout.

In Step S123 shown in FIG. 8, the image composition unit 132 of the portable terminal 100-1 functioning as a host composes the first image within the frame F1 of the layout and composes the second images received from the portable terminals 100-2 and 100-3 functioning as a client within the frames F2 and F3 of the layout to create the collage image; however, in a case where the fun mode is ON, the created collage image is not displayed on the display 105.

Portable Terminal 100-1 of Second Embodiment

Figure 20:
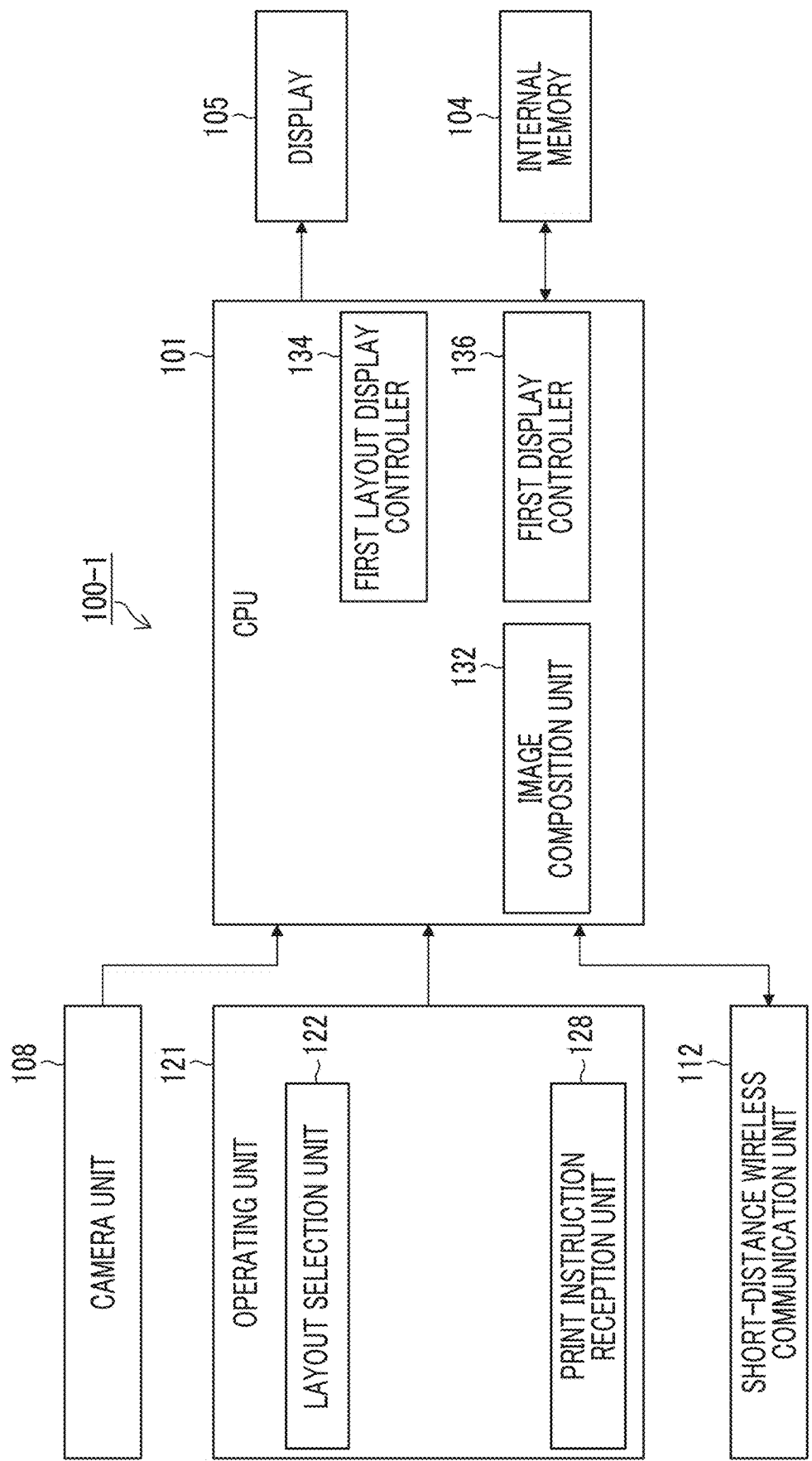
FIG. 20 is a block diagram showing principal functions of the portable terminal 100-1 functioning as a host of a second embodiment.

FIG. 20 is a block diagram showing principal functions of the portable terminal 100-1 functioning as a host of a second embodiment in the collage image creation system 1 shown in FIG. 1. In FIG. 20, the portions common to the portable terminal 100-1 of the first embodiment shown in FIG. 4 are represented by the same reference numerals, and detailed description thereof will not be repeated.

The portable terminal 100-1 of the second embodiment is different from the portable terminal 100-1 of the first embodiment in that the selection and the edition of the first image are not performed, and the first image is captured.

Accordingly, the portable terminal 100-1 of the second embodiment shown in FIG. 20 has a configuration in which a camera unit (first camera unit) 108 is added, the first image selection unit 124 and the first edition instruction reception unit 126 in the operating unit 120 are deleted, and the first edition unit 130 in the CPU 101 is deleted, compared to the first embodiment shown in FIG. 4.

The camera unit 108 captures a live view image and captures an image (first image) according to an imaging instruction from an imaging button.

The first display controller 136 makes the live view image captured by the camera unit 108 or the first image captured as a static image be displayed within the frame F1 allocated to the portable terminal 100-1 among a plurality of frames of the layout displayed on the display 105.

The user of the portable terminal 100-1 can set a composition matching the frame F1 or can change a zoom magnification or an imaging distance to adjust a size of an image while viewing the live view image within the frame F1 of the layout displayed on the display 105.

In a case where the first image is captured by the camera unit 108 according to the imaging instruction from the imaging button, the image composition unit 132 composes the captured first image within the frame F1 of the layout. As described below, in a case where the second images are received from the portable terminals 100-2 and 100-3 functioning as a client through the short-distance wireless communication unit 112, the second images received from the portable terminals 100-2 and 100-3 are composed within the frames F2 and F3 of the layout allocated to the portable terminals 100-2 and 100-3.

In a case where the first image is captured by the camera unit 108, the portable terminal 100-1 transmits the first image to the portable terminals 100-2 and 100-3 through the short-distance wireless communication unit 112 such that the first image can be confirmed on the portable terminals 100-2 and 100-3 side functioning as a client.

Portable Terminal 100-2 of Second Embodiment

Figure 21:
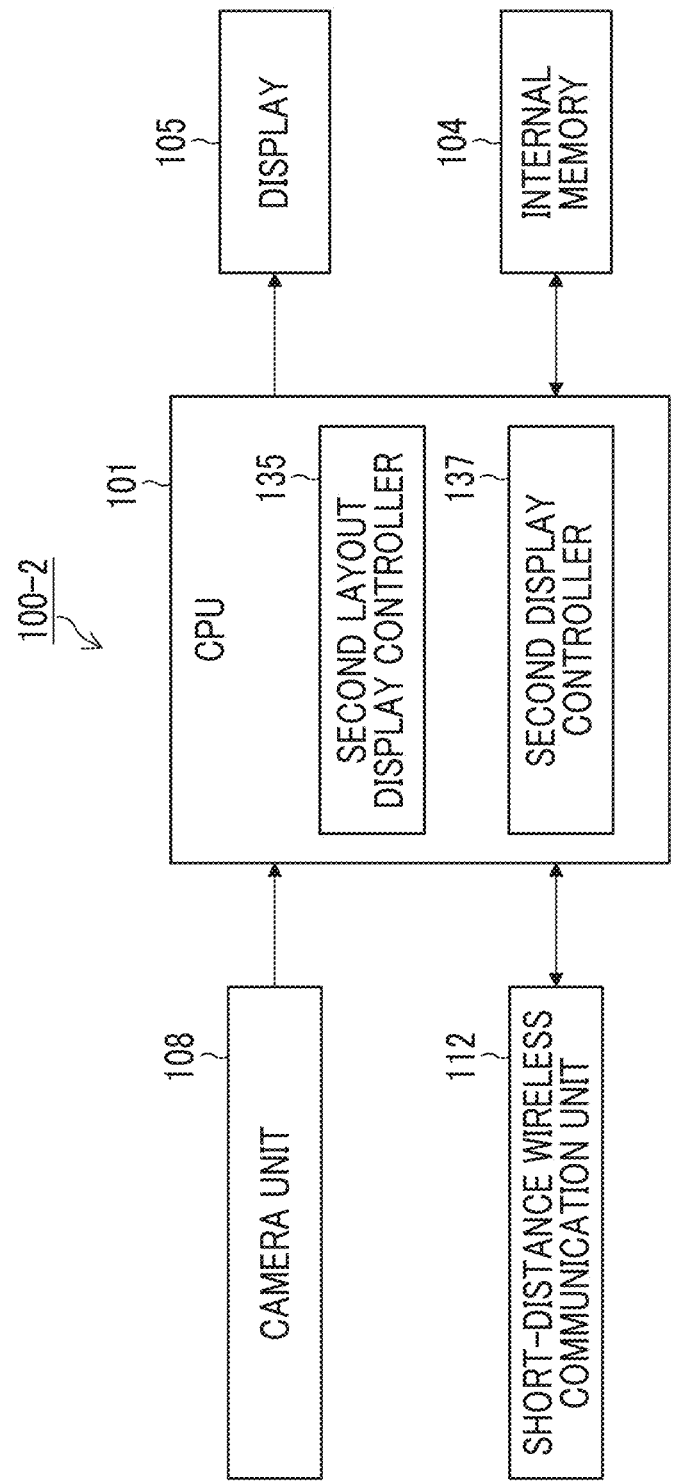
FIG. 21 is a block diagram showing principal functions of the portable terminal 100-2 functioning as a client of the second embodiment.

FIG. 21 is a block diagram showing principal functions of the portable terminal 100-2 functioning as a client of the second embodiment in the collage image creation system 1 shown in FIG. 1. In FIG. 21, the portions common to the portable terminal 100-2 of the first embodiment shown in FIG. 5 are represented by the same reference numerals, and detailed description thereof will not be repeated.

The portable terminal 100-2 of the second embodiment is different from the portable terminal 100-1 of the second embodiment in that the selection and the edition of the second image are not performed, and the second image is captured.

Accordingly, the portable terminal 100-2 of the second embodiment shown in FIG. 21 has a configuration in which a camera unit (second camera unit) 108 is added, the operating unit 121 is deleted, and the second edition unit 131 in the CPU 101 is deleted, compared to the first embodiment shown in FIG. 5.

The camera unit 108 captures a live view image and captures an image (second image) according to an imaging instruction from an imaging button.

The second display controller 137 makes the live view image captured by the camera unit 108 or the second image captured as a static image be displayed within the frame F2 allocated to the portable terminal 100-2 among a plurality of frames of the layout displayed on the display 105. In a case where the first image is received from the portable terminal 100-1 functioning as a host, the second display controller 137 makes the received first image be displayed within the frame F1 allocated to the portable terminal 100-1 among a plurality of frames of the layout.

The user of the portable terminal 100-2 can set a composition matching the frame F2 or can change a zoom magnification or an imaging distance to adjust a size of an image while viewing the live view image within the frame F2 of the layout displayed on the display 105.

In a case where the second image is captured by the camera unit 108 according to the imaging instruction from the imaging button, the second image is transmitted to the portable terminal 100-1 functioning as a host through the short-distance wireless communication unit 112.

With the collage image creation system including the portable terminals 100-1, 100-2, and the like of the second embodiment, the image (the first image or the second image) for use in the creation of the collage image can be captured directly by the camera unit 108, and the first image or the second image is made recapturable, whereby it is possible to acquire an image suitable for a collage image similarly to a case where the first image or the second image is edited.

A collage image creation system in which the portable terminals of the first embodiment and the portable terminals of the second embodiment are mixed may be constituted. For example, while the portable terminal 100-1 functioning as a host may select the first image for use in the creation of the collage image from the internal memory 104 and may edit the selected first image, the portable terminal 100-2 functioning as a client may directly acquire the second image for use in the creation of the collage image through imaging with the camera unit 108.

Collage Image Creation Method of Second Embodiment

Figure 22A:
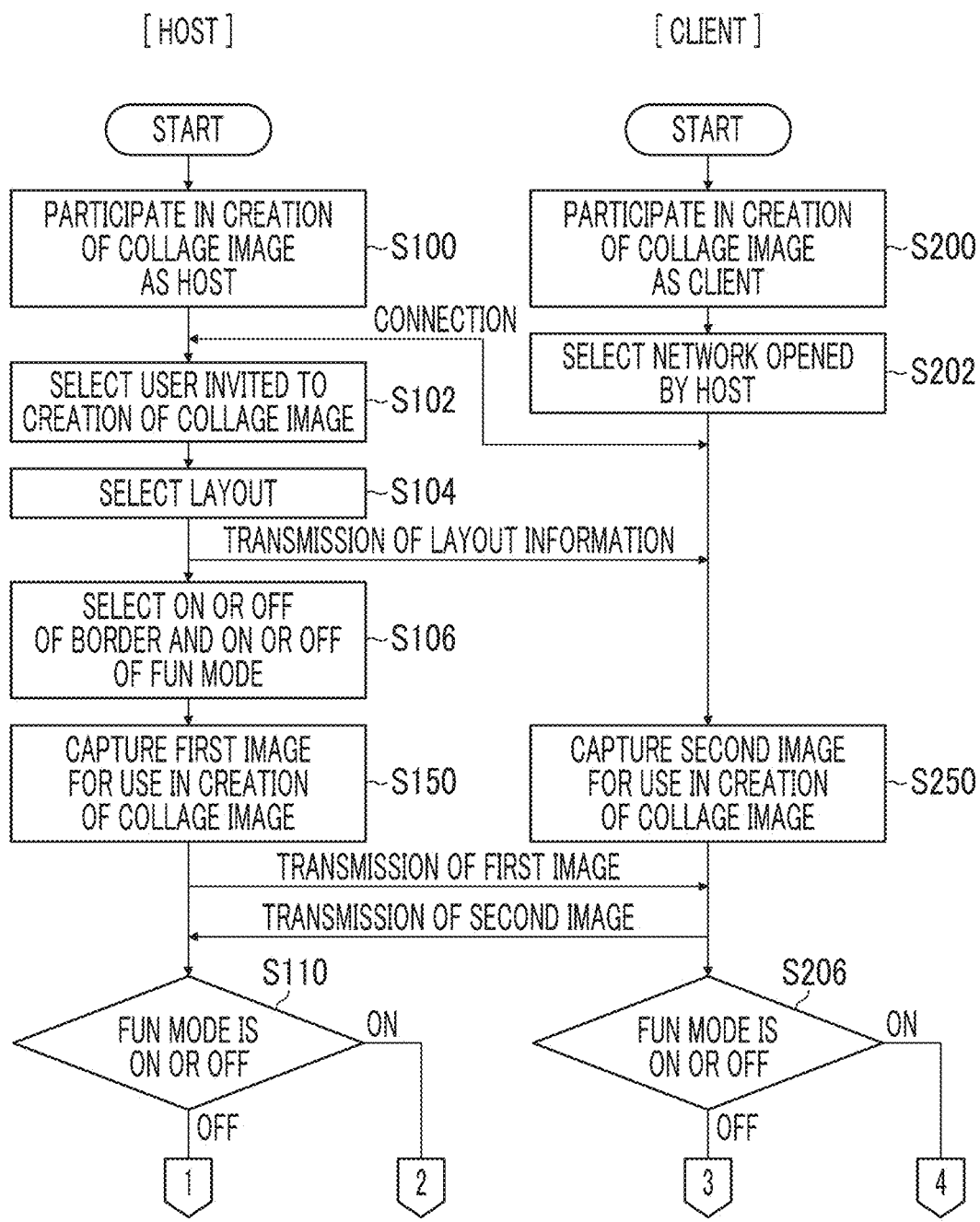
FIG. 22A is a part of a flowchart showing a main part of a collage image creation method according to the second embodiment of the invention.
Figure 22B:
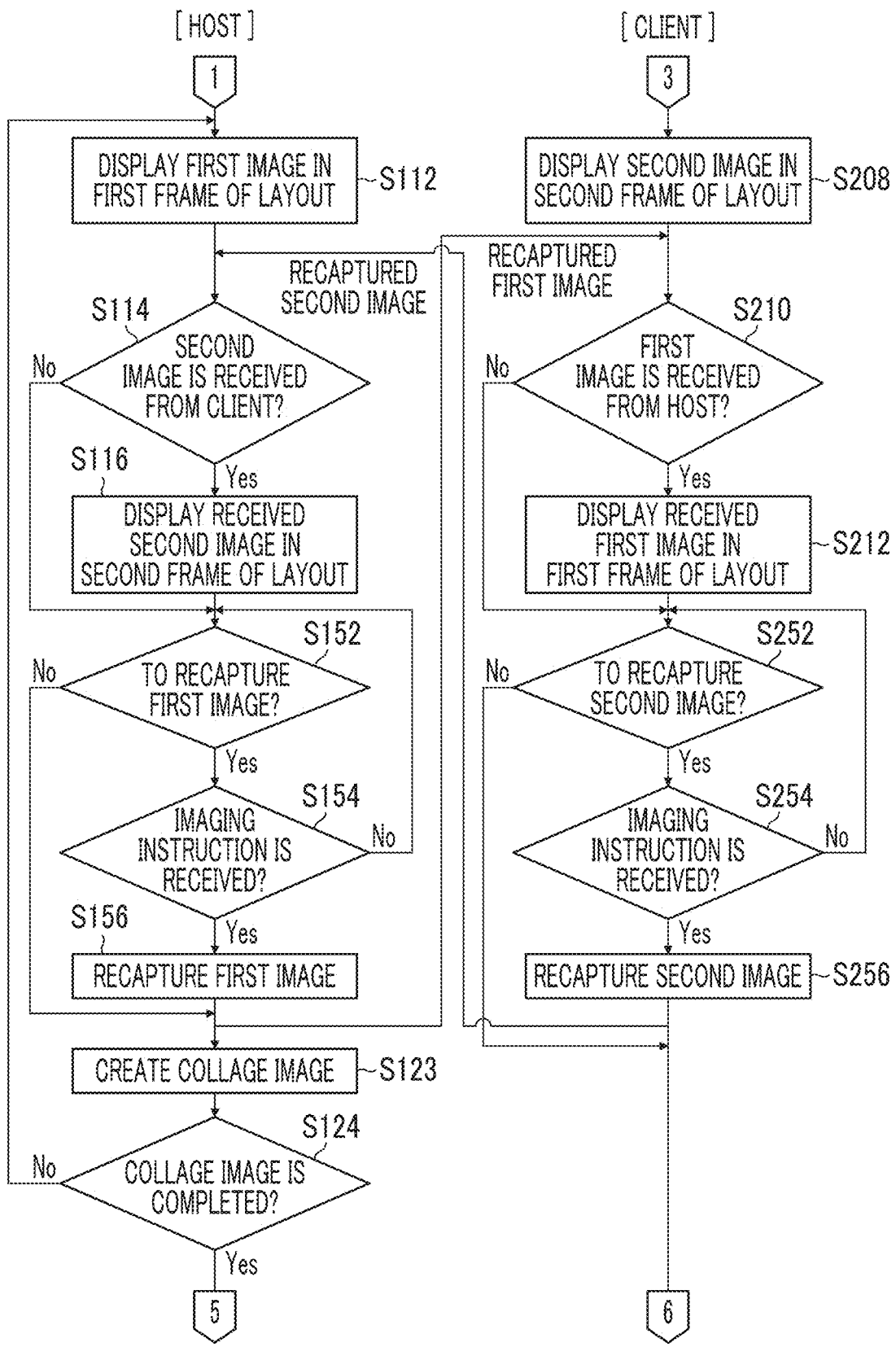
FIG. 22B is a flowchart subsequent to the flowchart shown in FIG. 22A.

FIGS. 22A and 22B are flowcharts showing a main part of a collage image creation method according to the second embodiment of the invention.

The collage image creation method of the second embodiment shows a method that is carried out by the collage image creation system constituted of the portable terminals 100-1 and 100-2 of the second embodiment shown in FIGS. 20 and 21. FIGS. 22A and 22B are processing portions corresponding to FIGS. 7A and 7B of the first embodiment of the collage image creation method. A processing portion corresponding to FIG. 7C is a common processing portion, and thus, description thereof will not be repeated. In FIGS. 22A and 22B, the portions common to FIGS. 7A and 7B of the first embodiment of the collage image creation method are represented by the same step numbers, and detailed description thereof will not be repeated.

The user of the portable terminal 100-1 functioning as a host captures a live view image with the camera unit 108. The captured live view image is displayed within the frame F1 of the layout displayed on the display 105 by the first display controller 136. With this, the user can set a composition matching the frame F1 or can change a zoom magnification or an imaging distance to adjust a size of an image while viewing the live view image within the frame F1 of the layout displayed on the display 105.

In Step S150 of FIG. 22A, in a case where the imaging instruction from the imaging button is received, the camera unit 108 provided in the portable terminal 100-1 captures an image (first image) for use in the creation of the collage image.

On the other hand, the user of each of the portable terminals 100-2 and 100-3 functioning as a client captures a live view image with the camera unit 108. The captured live view image is displayed within the frame F2 or F3 of the layout displayed on the display 105 by the second display controller 137. With this, the user can set a composition matching the frame F2 or F3 or can change a zoom magnification or an imaging distance to adjust a size of an image while viewing the live view image within the frame F2 or F3 of the layout displayed on the display 105.

In Step S250 of FIG. 22A, in a case where the imaging instruction from the imaging button is received, the camera unit 108 provided in each of the portable terminals 100-2 and 100-3 captures an image (second image) for use in the creation of the collage image.

Next, a case where the fun mode is set to OFF in Step S110 and Step S206 will be described.

In this case, the portable terminal 100-1 functioning as a host and the portable terminals 100-2 and 100-3 functioning as a client are transited to processing shown in FIG. 22B.

In FIG. 22B, the first display controller 136 of the portable terminal 100-1 functioning as a host makes the first image captured in Step S150 be displayed in the first frame (frame F1) of the layout (Step S112).

The second display controller 137 of each of the portable terminals 100-2 and 100-3 functioning as a client makes the second image captured in Step S250 be displayed in the corresponding second frame (the frame F2 or F3) of the layout (Step S208).

Next, the portable terminal 100-1 functioning as a host determines whether or not to recapture the first image (Step S152).

As shown in FIG. 14 and the like, in a case where the "back" button BB on the screen of the portable terminal 100-1 is touched, the portable terminal 100-1 returns to a previous state, makes a live view image be displayed in the frame F1 of the layout, and makes the first image recapturable.

In Step S152, in a case where determination is made that recapturing of the first image is performed, thereafter, determination is made whether or not an imaging instruction an imaging button is received (Step S154). Then, in a case where an imaging instruction is received (in a case of "Yes"), the camera unit 108 provided in the portable terminal 100-1 recaptures (captures again) the first image for use in the creation of the collage image (Step S156).

In a case where recapturing of the first image is performed, a recaptured latest first image is transmitted to the portable terminals 100-2 and 100-3 functioning as a client. This is to update the first image within the frame F1 of the layout displayed on the display 105 of each of portable terminals 100-2 and 100-3 on the portable terminals 100-2 and 100-3 side.

Similarly, each of the portable terminals 100-2 and 100-3 functioning as a client determines whether or not to recapture the second image (Step S252).

In Step S252, in a case where determination is made that recapturing of the second image is performed, thereafter, determination is made whether or not an imaging instruction from an imaging button is received (Step S254). Then, in a case where the imaging instruction is received (in a case of "Yes"), the camera unit 108 provided in each of the portable terminals 100-2 and 100-3 recaptures (captures again) the second image for use in the creation of the collage image (Step S256).

In a case where recapturing of the second image is performed, a recaptured latest second image is transmitted to the portable terminal 100-1 functioning as a host. This is to update the second image within each of the frames F2 and F3 of the layout displayed on the display 105 of the portable terminal 100-1.

Figure 23:
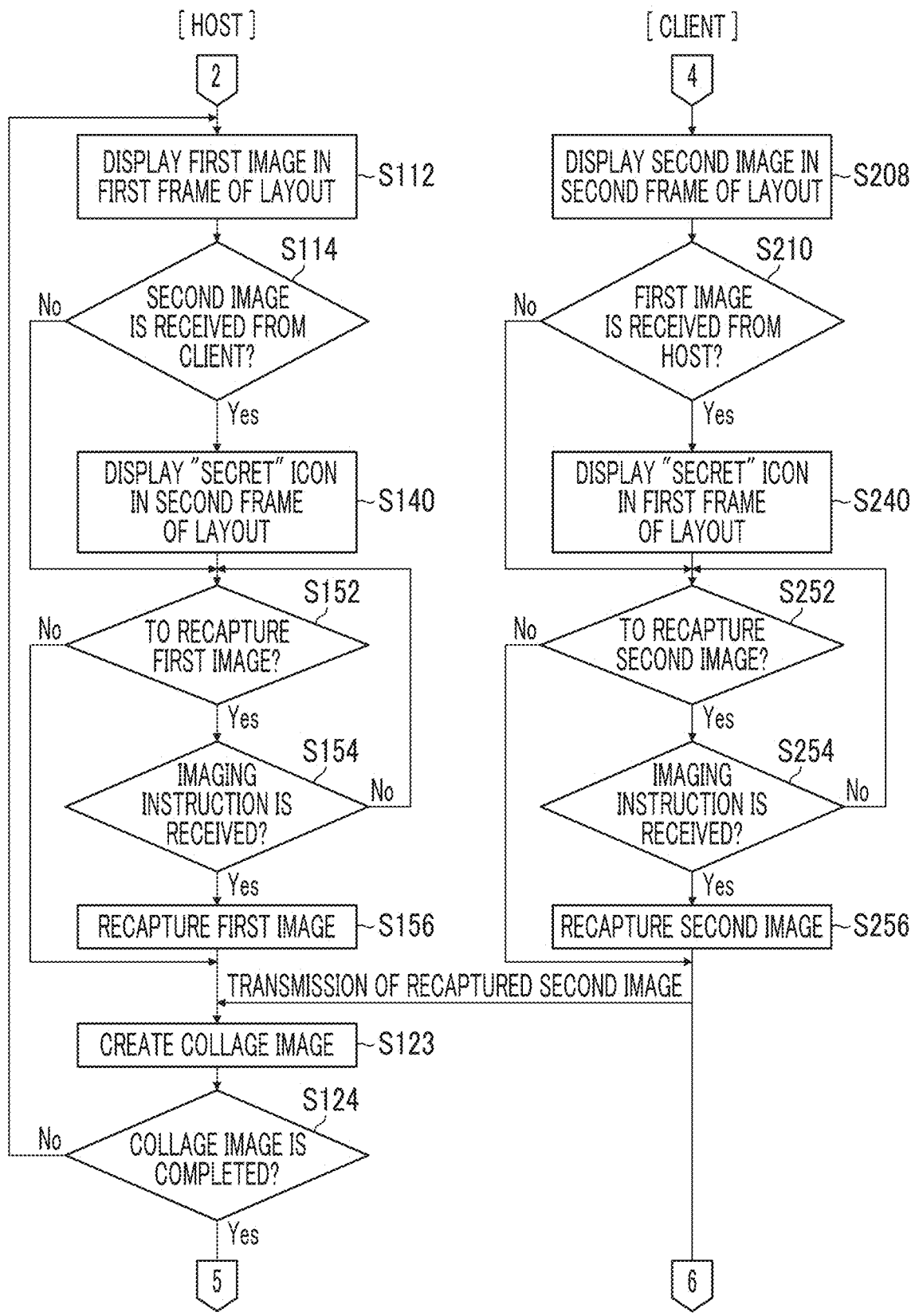
FIG. 23 is a flowchart in a case where the fin mode is ON, and is a flowchart in place of the flowchart shown in FIG. 22B.

In Step S110 and Step S206 shown in FIG. 22A, in a case where determination is made that the fun mode is ON, the process is transited to Step S112 and Step S208 shown in FIG. 23. In FIG. 23, the steps common to FIG. 22B are represented by the same step numbers, and detailed description thereof will not be repeated.

In Step S112 of FIG. 23, the first display controller 136 of the portable terminal 100-1 functioning as a host makes only the first image captured in Step S150 be displayed in the frame F1 of the layout.

In Step S114, in a case where determination is made that the second image for use in the creation of the collage image is received from each of the portable terminals 100-2 and 100-3 functioning as a client (in a case of "Yes"), the first display controller 136 does not make the received second images be displayed in the corresponding frames F2 and F3 of the layout, and makes the "SECRET" icon indicating the second image is in secret be displayed (Step S140).

In Step S210 of FIG. 23, in a case where determination is made that the first image for use in the creation of the collage image is received from the portable terminal 100-1 functioning as a host (in a case of "Yes"), the second display controller 137 of each of the portable terminals 100-2 and 100-3 functioning as a client does not make the received first image be displayed within the corresponding frame F1 of the layout, and makes the "SECRET" icon indicating that the first image is in secret be displayed (Step S240).

In a case where the fun mode is ON, the portable terminal 100-1 functioning as a host may not transmit the first image to the portable terminals 100-2 and 100-3 functioning as a client, and may transmit information indicating that the first image is captured (the first image is kept secret). The second display controller 137 of each of the portable terminals 100-2 and 100-3 that receive information makes the "SECRET" icon indicating that the first image is in secret be displayed within the frame F1 of the layout.

In Step S123 shown in FIG. 23, the image composition unit 132 of the portable terminal 100-1 functioning as a host composes the first image within the frame F1 of the layout and composes the second images received from the portable terminals 100-2 and 100-3 functioning as a client within the frames F2 and F3 of the layout to create the collage image; however, in a case where the fun mode is ON, the created collage image is not displayed on the display 105.

In a case where the fun mode is ON, each user can confirm only the image of the user among a plurality of images for use in the creation of the collage image on the display 105, but cannot confirm the images of other users and cannot confirm the completed collage image. Then, each user can initially confirm the collage image in a case where the completed collage image is printed by the printer 10.

In a case where the fun mode is ON, in the example, each user can initially confirm the collage image in a case where the collage image is printed by the printer 10; however, the invention is not limited thereto. The user of the portable terminal functioning as a host may confirm the collage image even though the fun mode is ON, and the user of the portable terminal functioning as a client may confirm only the image of the user, and in a case where the completed collage image is transmitted from the portable terminal functioning as a host, may confirm the collage image.

A playback time setting function of the collage image may be provided, and a function of prohibiting playback or printing of the collage image after a given time has elapsed or in a case where a specific day does not come may be provided. For example, a function of prohibiting printing or playback of the transmitted collage image in a case where a specific day does not come (for example, the birthday of the friend), or the like while the collage image is transmitted from the portable terminal functioning as a host to a friend may be added.

A way to use in a time capsule manner, such as transmitting the collage image to a person, a friend, a classmate, or the like who participates in the creation of the collage image after a given period has elapsed (for example, ten years), is also considered.

In the example, in regard to the selected layout, the frame F1 is allocated to the user of the portable terminal 100-1 functioning as a host, and the frames F2 and F3 are allocated to the users of the portable terminals 100-2 and 100-3 functioning as a client, respectively; however, the allocation of the frames may be automatically performed in a step in which the layout is selected, the user of the portable terminal 100-1 functioning as a host may decide the allocation of the frames, or each user who participates in the creation of the collage image may reserve the frame for composing the image of the user.

In a case where each user reserves (selects) the frame for composing the image of the user, a certain portable terminal (user) can select any frame from among a plurality of frames within the layout, and the frame is reserved (allocated) to the portable terminal with the selection of the frame.

Information regarding the reserved frame is transmitted to other portable terminals, other portable terminals are transited to processing for performing exclusive control such that the reserved frame cannot be edited, and the reserved frame cannot be selected. Accordingly, another portable terminal (user) reserves (selects) one frame (target to be edited) for composing the image of the portable terminal from among the unreserved frames within the layout. In a case where a frame is deselected or edition or transmission is completed in a certain portable terminal, another portable terminal (user) can select the frame.

It should be noted that, after the image is selected, edition of the image may not be performed, and the "transmit" button may be operated to transmit the image.

Collage Image Creation System of Second Embodiment

Figure 24:
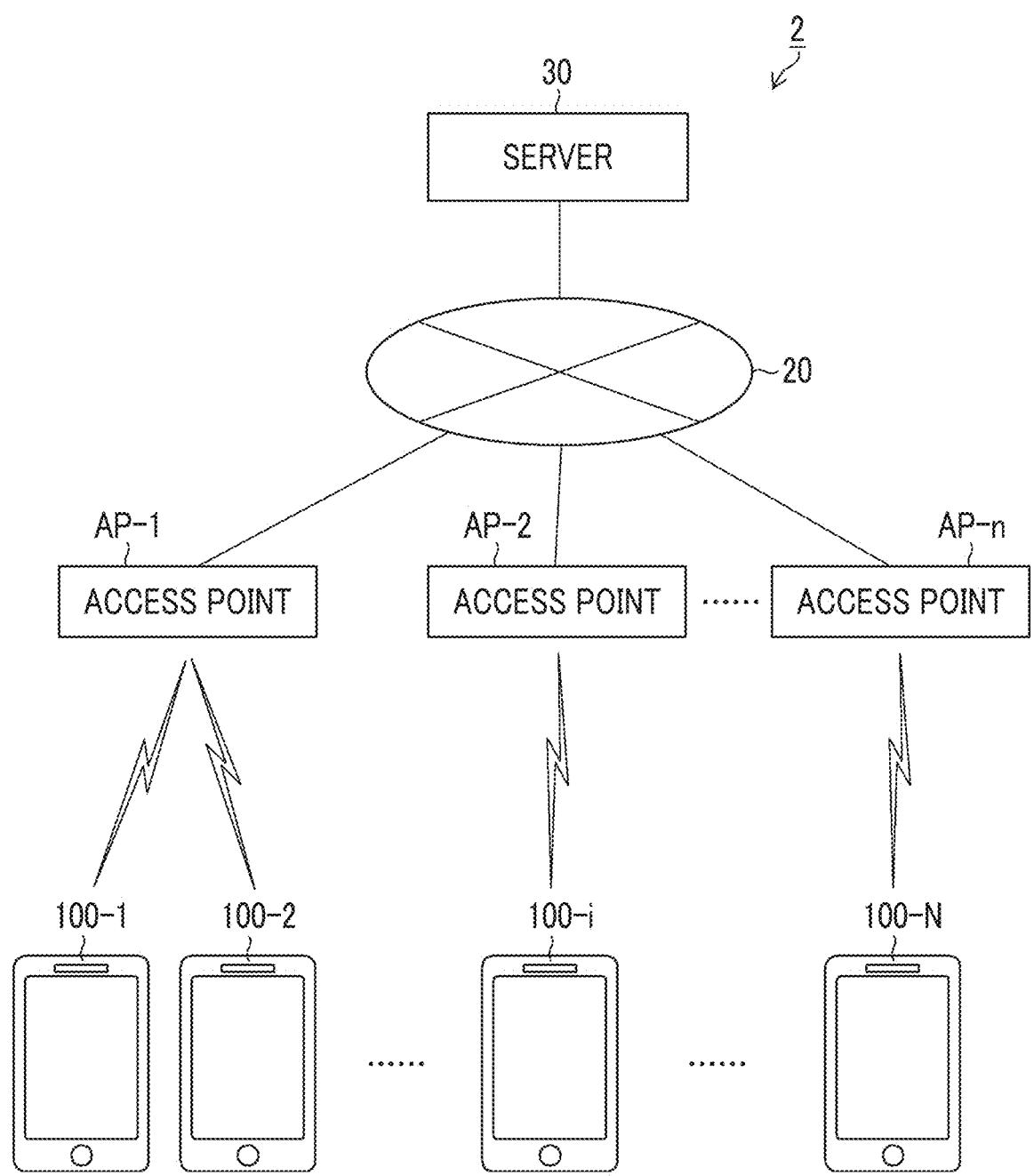
FIG. 24 is a system configuration diagram of a collage image creation system according to the second embodiment of the invention.

FIG. 24 is a system configuration diagram of a collage image creation system according to the second embodiment of the invention.

A collage image creation system 2 of the second embodiment shown in FIG. 23 is constituted of a plurality of portable terminals 100-1 to 100-N carried with a plurality of users, a wide area network 20, such as the Internet, and a server 30 connected to the network 20.

Although a plurality of portable terminals 100-1 to 100-N are the same as the portable terminals shown in FIG. 1, the portable terminals 100-1 to 100-N are constituted such that communication can be performed among the portable terminals 100-1 to 100-N at geographically distant places through access points AP-1, AP-2, . . . , and AP-n, the network 20, and the server 30.

The access points AP-1, AP-2, . . . , and AP-n are, for example, base stations, wireless local area network (LAN) routers, wireless LAN hot spots, and the like of portable carriers. Each of the portable terminals 100-1 to 100-N performs wireless communication with other portable terminals through the access points communicable using the communication unit 111 and the network 20.

The server 30 is a service server that plays a role of allowing communication according to a request from each portable terminal among a plurality of portable terminals (one portable terminal functioning as a host and one or more portable terminals functioning as a client) that create the collage image.

With the collage image creation system 2 of the second embodiment, it is possible to allow a plurality of users at remote places having the portable terminals 100-1 to 100-N to create one collage image in cooperation.

Others

In the embodiment, although the portable terminal 100-1 functioning as a host can create the collage image and can output the created collage image to the printer 10, the invention is not limited thereto, and each of all portable terminals functioning as a host or a client may create and display a collage image and may output the created collage image to the printer 10.

Although the portable terminal 100 shown in FIG. 2 has the camera unit 108, the portable terminals of the first embodiment shown in FIGS. 4 and 5 may not have a camera unit.

The hardware structures of the portable terminal include various processors described below. Various processors include a central processing unit (CPU) that is a general-purpose processor executing software (program) to function as various controllers, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination of two or more processors (for example, a plurality of FPGAs or a combination of a CPU and an FPGA) of the same type or different types. A plurality of controllers may be configured of one processor. As an example where a plurality of controllers are configured of one processor, first, as represented by a computer, such as a client or a server, there is a form in which one processor is configured of a combination of one or more CPUs and software, and the processor functions as a plurality of controllers. Secondly, as represented by system on chip (SoC) or the like, there is a form in which a processor that implements all functions of a system including a plurality of controllers into one integrated circuit (IC) chip is used. In this way, various controllers may be configured using one or more processors among various processors described above as a hardware structure.

The invention includes a collage image creation program that is installed on a general-purpose portable terminal to cause the general-purpose portable terminal to implement various functions (a layout selection function, a layout display control function, a display control function, an edition function, an image composition function, and the like) as the portable terminal constituting the collage image creation system according to the embodiment of the invention, and a recording medium storing the program.

The invention is not limited to the above-described embodiments, and may have various modifications without departing from the spirit of the invention.

EXPLANATION OF REFERENCES 1, 2: collage image creation system
10: printer
12: instant film
16: power button
20: network
30: server
100, 100-1, 100-2, 100-3, 100-N: portable terminal
101: CPU
104: internal memory
105: display
106: touch pad
107: GPS reception unit
108: camera unit
109: microphone unit 110: speaker unit
111: communication unit
111A, 112A: antenna
112: short-distance wireless communication unit
113: sensor unit
114: medium drive
115: memory card
120, 121: operating unit
122: layout selection unit
124: first image selection unit
125: second image selection unit
126: first edition instruction reception unit
127: second edition instruction reception unit
128: print instruction reception unit
130: first edition unit
131: second edition unit
132: image composition unit
134: first layout display controller
135: second layout display controller
136: first display controller
137: second display controller
200: top screen
A1, A2, AS, PI, PL: area
AP-1, AP-2, AP-n: access point
BB: "back" button
F1, F2, F3: frame
MA1: first group display area
MA2: second group display area.
MA3: printer information display area
MB1: "simple print" button
MB2: "movie print" button
MB3: "instant camera" button
MB4: "template print" button
MB5: "collage print" button
MB6: "affinity diagnosis" button
MB7: "collage with everyone" button
MB11: "simple print" button
MB12: "fun mode" button
MB13: "edit image" button
MB14: "transmit" button
MB15: "edition completion" button
MG1: first group
MG2: second group
S100 to S256: step
SEB: "set" button
ST: "start" button
TB: "top" button

What is claimed is:

1. A collage image creation system comprising:
one first portable terminal that functions as a host; and
one second portable terminal that functions as a client and is able to perform communication with the first portable terminal,
wherein the collage image creation system creates a collage image based on a first image stored in the first portable terminal and a second image stored in the second portable terminal,
the first portable terminal comprises:
a first display, and
a first processor configured to:
select one layout from among a plurality of layouts for the collage image creation,
make the first display unit display the selected layout,
select the first image for use in the creation of the collage image from among a plurality of images stored in the first portable terminal,
make the selected first image be displayed within a first frame allocated to the first portable terminal among a plurality of frames of the selected layout displayed on the first display,
receive an edition instruction to the first image,
edit the first image displayed within the first frame according to the edition instruction, and
transmit information regarding the selected layout to the second portable terminal and receive the second image selected in the second portable terminal from the second portable terminal,
the second portable terminal comprises:
a second display, and
a second processor configured to:
make the second display display the selected layout based on the information regarding the selected layout transmitted from the first portable terminal,
select the second image for use in the creation of the collage image from among a plurality of images stored in the second portable terminal,
make the selected second image be displayed within a second frame allocated to the second portable terminal among the plurality of frames of the selected layout displayed on the second display,
receive an edition instruction to the second image,
edit the second image displayed within the second frame according to the edition instruction, and
receive the information regarding the selected layout transmitted from the first portable terminal and transmit the edited second image to the first portable terminal, and
wherein the first processor is further configured to
compose the edited first image within the first frame of the selected layout and compose the edited second image within the second frame of the selected layout to create the collage image,
select a first mode in which the first display is made to display the first image and the second image and a second mode in which the first display is made to display only the first image,
compose the first image within the first frame of the layout displayed on the first display and composes the second image within the second frame in a case where the first mode is selected, and
composes only the first image within the first frame of the layout displayed on the first display in a case where the second mode is selected, and
the second processor is further configured to
compose the first image within the first frame of the layout displayed on the second display, compose the second image within the second frame in a case where the first mode is selected, and
compose only the second image within the second frame of the layout displayed on the second display in a case where the second mode is selected.

2. The collage image creation system according to claim 1,
wherein the first processor is further configured to:
receive at least one edition instruction among magnification, reduction, movement, rotation, and image processing contents of the first image, and
make the first image processed based on the edition instruction be displayed within the first frame of the layout displayed on the first display, and the second processor is further configured to:
receive at least one edition instruction among magnification, reduction, movement, rotation, and image processing contents of the second image, and
make the second image processed based on the edition instruction be displayed within the second frame of the layout displayed on the second display.

3. The collage image creation system according to claim 1,
wherein the first processor is further configured to make the allocated first frame be displayed on the first display to be distinguishable from other frames, and
the second processor is further configured to make the allocated second frame be displayed on the second display to be distinguishable from other frames.

4. The collage image creation system according to claim 2,
wherein the first processor is further configured to make the allocated first frame be displayed on the first display to be distinguishable from other frames, and
the second processor is further configured to make the allocated second frame be displayed on the second display to be distinguishable from other frames.

5. The collage image creation system according to claim 1,
wherein the first processor and the second processor are further configured to perform wireless communication with each other directly or perform communication with each other through an access point and a network.

6. The collage image creation system according to claim 2,
wherein the first processor and the second processor are further configured to perform wireless communication with each other directly or perform communication with each other through an access point and a network.

7. The collage image creation system according to claim 1,
wherein the first processor is further configured to transmit the collage image to a printer.

8. The collage image creation system according to claim 7,
wherein the first processor is further configured to:
receive a print instruction of the collage image only in a case where the collage image in which the first image and the second image are composed within all frames of the layout is created, and
transmit the collage image to the printer in a case where the print instruction is received.

9. The collage image creation system according to claim 1,
wherein each of the first processor and the second processor are further configured to make the first portable terminal or the second portable terminal function as the host or the client,
the first portable terminal becomes the second portable terminal in a case where a function of the client is selected, and
the second portable terminal becomes the first portable terminal in a case where a function of the host is selected.

10. A non-transitory computer readable recording medium storing a collage image creation program that is installed on a portable terminal,
wherein the collage image creation program is installed on the portable terminal to make the portable terminal function as the first portable terminal or the second portable terminal constituting the collage image creation system according to claim 1.

11. A collage image creation method that uses one first portable terminal including a first processor and functioning as a host, and one second portable terminals including a second processor and functioning as a client and being able to perform communication with the first portable terminal, and creates a collage image based on a first image stored in the first portable terminal and a second image stored in the second portable terminal, the collage image creation method comprising:
a step of selecting one layout from among a plurality of layouts for collage image creation with the first processor;
a step in which the first processor makes a first display of the first portable terminal display the selected layout;
a step of selecting the first image for use in the creation of the collage image from a plurality of images stored in the first portable terminal through an image selection operation in the first processor;
a step in which the first processor makes the selected first image be displayed within a first frame allocated to the first portable terminal among a plurality of frames of the layout displayed on the first display;
a step in which, in a case where the first processor receives an edition instruction, the first processor edit the first image displayed within the first frame according to the received edition instruction;
a step in which the first processor transmits information regarding the selected layout to the second portable terminal and receives the second image selected in the second portable terminal from the second portable terminal;
a step in which the first processor selects a first mode in which the first display is made to display the first image and the second image and a second mode in which the first display is made to display only the first image;
a step in which the second processor makes a second display of the second portable terminal display the selected layout based on the information regarding the selected layout transmitted from the first portable terminal;
a step of selecting the second image for use in the creation of the collage image from a plurality of images stored in the second portable terminal through an image selection operation in the second processor;
a step in which the second processor makes the selected second image be displayed within a second frame allocated to the second portable terminal among the plurality of frames of the selected layout displayed on the second display;
a step in which, in a case where the second processor receives an edition instruction, the second processor edits the second image displayed within the second frame according to the received edition instruction;
a step in which the second processor receives the information regarding the selected layout transmitted from the first portable terminal and transmits the edited second image to the first portable terminal;
a step in which the first processor composes the edited first image within the first frame of the selected layout and composes the edited second image within the second frame of the selected layout to create the collage image;
a step in which the first processor composes the first image within the first frame of the layout displayed on the first display and composes the second image within the second frame in a case where the first mode is selected, and composes only the first image within the first frame of the layout displayed on the first display in a case where the second mode is selected; and a step in which the second processor composes the first image within the first frame of the layout displayed on the second display, compose the second image within the second frame in a case where the first mode is selected, and compose only the second image within the second frame of the layout displayed on the second display in a case where the second mode is selected.

* * * * *